US 9,414,245 B2

(12) United States Patent
Bevan et al.

(10) Patent No.: US 9,414,245 B2
(45) Date of Patent: Aug. 9, 2016

(54) METHOD AND APPARATUS FOR DETECTION OF INTERMODULATION PRODUCTS

(71) Applicant: AceAxis Limited, Harlow (GB)

(72) Inventors: David Damian Nicholas Bevan, Harlow (GB); Simon John Gale, Harlow (GB); Fiona Maihri Wilson, Harlow (GB)

(73) Assignee: ACEAXIS LIMITED, Harlow (GB)

( * ) Notice: Subject to any disclaimer, the term of this patent is extended or adjusted under 35 U.S.C. 154(b) by 23 days.

(21) Appl. No.: 14/603,199

(22) Filed: Jan. 22, 2015

(65) Prior Publication Data

US 2015/0133111 A1 May 14, 2015

Related U.S. Application Data

(63) Continuation of application No. 13/584,245, filed on Aug. 13, 2012, now Pat. No. 8,983,454.

(30) Foreign Application Priority Data

May 21, 2012 (GB) .................................. 1208921.5

(51) Int. Cl.
*H04W 24/06* (2009.01)
*H04B 7/04* (2006.01)
*H04B 1/10* (2006.01)
(Continued)

(52) U.S. Cl.
CPC ................. *H04W 24/06* (2013.01); *H04B 1/10* (2013.01); *H04B 1/1027* (2013.01); *H04B 1/123* (2013.01); *H04B 7/0413* (2013.01); *H04W 24/08* (2013.01)

(58) Field of Classification Search
CPC .. G01R 27/02; G01R 27/2605; G01R 31/343; H01L 27/0248; H04W 24/06
See application file for complete search history.

(56) References Cited

U.S. PATENT DOCUMENTS

| 5,749,051 A | 5/1998 | Dent |
| 6,704,349 B1 | 3/2004 | Masenten |
| 2003/0021367 A1 | 1/2003 | Smith |

(Continued)

FOREIGN PATENT DOCUMENTS

| DE | 102010033841 A1 | 2/2012 |
| EP | 2104266 A2 | 9/2009 |

(Continued)

OTHER PUBLICATIONS

Rafie et al., "Simulation-Based Estimation of Intermodulation Distortion and C/IM," GlOBECOM '92, Communication for Global Users, IEEE Global Telecommunications Conference, 2:700-706 (1992).

(Continued)

*Primary Examiner* — Myron K Wyche
(74) *Attorney, Agent, or Firm* — EIP US LLP

(57) ABSTRACT

Interference comprising an intermodulation product of at least a first signal and a second signal is detected in a wireless network, by generating, on the basis of at least the first signal and the second signal, at least one interference signal comprising a simulated intermodulation product and correlating the at least one interference signal with a waveform received in the wireless system to produce data representing a correlation. The presence of an intermodulation product of at least the first signal and the second signal is detected in the interference in dependence on the data representative of the correlation.

16 Claims, 16 Drawing Sheets

(51) Int. Cl.
*H04B 1/12* (2006.01)
*H04W 24/08* (2009.01)

(56) References Cited

U.S. PATENT DOCUMENTS

| | | |
|---|---|---|
| 2004/0048576 A1 | 3/2004 | Hildebrand et al. |
| 2007/0184782 A1 | 8/2007 | Sahota et al. |
| 2008/0039045 A1 | 2/2008 | Filipovic et al. |
| 2008/0159453 A1 | 7/2008 | Smith |
| 2009/0068974 A1 | 3/2009 | Smith |
| 2009/0086864 A1 | 4/2009 | Komninakis et al. |
| 2009/0125253 A1 | 5/2009 | Blair et al. |
| 2011/0075754 A1 | 3/2011 | Smith |
| 2011/0149714 A1 | 6/2011 | Rimini et al. |
| 2012/0140685 A1 | 6/2012 | Lederer et al. |
| 2012/0236976 A1 | 9/2012 | Smith |
| 2012/0295558 A1 | 11/2012 | Wang et al. |
| 2013/0044791 A1 | 2/2013 | Rimini et al. |

FOREIGN PATENT DOCUMENTS

| | | |
|---|---|---|
| WO | 2008021815 A1 | 2/2008 |
| WO | 2009082084 A1 | 7/2009 |
| WO | 2009088788 A1 | 7/2009 |
| WO | 2010106752 A2 | 9/2010 |

OTHER PUBLICATIONS

International Search Report dated Dec. 5, 2013 (published Jan. 30, 2014) issued on related application PCT/GB2013/051320.

$$(A\cos(a) + B\cos(b) + C\cos(c))^3 = \frac{3}{4}A^3\cos(a) + \frac{1}{4}A^3\cos(3a) + \frac{3}{4}A^2B\cos(2a-b) + \frac{3}{4}A^2B\cos(2a+b) +$$

$$\frac{3}{4}A^2C\cos(2a-c) + \frac{3}{4}A^2C\cos(2a+c) + \frac{3}{4}AB^2\cos(a-2b) +$$

$$\frac{3}{4}AB^2\cos(a+2b) + \frac{3}{2}ABC\cos(a-b-c) + \frac{3}{2}ABC\cos(a+b-c) +$$

$$\frac{3}{2}ABC\cos(a-b+c) + \frac{3}{2}ABC\cos(a+b+c) + \frac{3}{2}AB^2\cos(a) +$$

$$\frac{3}{4}AC^2\cos(a-2c) + \frac{3}{4}AC^2\cos(a+2c) + \frac{3}{2}AC^2\cos(a) + \frac{3}{2}A^2B\cos(b) +$$

$$\frac{3}{2}A^2C\cos(c) + \frac{3}{4}B^3\cos(b) + \frac{1}{4}B^3\cos(3b) + \frac{3}{4}B^2C\cos(2b-c) +$$

$$\frac{3}{4}B^2C\cos(2b+c) + \frac{3}{4}BC^2\cos(b-2c) + \frac{3}{4}BC^2\cos(b+2c) +$$

$$\frac{3}{2}BC^2\cos(b) + \frac{3}{2}B^2C\cos(c) + \frac{3}{4}C^3\cos(c) + \frac{1}{4}C^3\cos(3c)$$

$A = A_a(t)$; $B = B_b(t)$; $C = C_c(t)$ → Amplitude Modulation (A.M.)

$a = 2\pi f_a t + \phi_a(t)$; $b = 2\pi f_b t + \phi_b(t)$; $c = 2\pi f_c t + \phi_c(t)$; → carrier plus Phase Modulation (P.M.)

Figure 7

$$(A\cos(a) + B\cos(b))^5 = \frac{5}{8}A^5\cos(a) + \frac{5}{16}A^5\cos(3a) + \frac{1}{16}A^5\cos(5a) +$$
$$\frac{5}{4}A^4 B\cos(2a-b) + \frac{5}{16}A^4 B\cos(4a-b) + \frac{5}{4}A^4 B\cos(2a+b) +$$
$$\frac{5}{16}A^4 B\cos(4a+b) + \frac{15}{8}A^3 B^2\cos(a-2b) + \frac{5}{8}A^3 B^2\cos(3a-2b) +$$
$$\frac{15}{8}A^3 B^2\cos(a+2b) + \frac{5}{8}A^3 B^2\cos(3a+2b) + \frac{15}{4}A^3 B^2\cos(a) +$$
$$\frac{5}{4}A^3 B^2\cos(3a) + \frac{5}{8}A^2 B^3\cos(2a-3b) + \frac{15}{8}A^2 B^3\cos(2a-b) +$$
$$\frac{15}{8}A^2 B^3\cos(2a+b) + \frac{5}{8}A^2 B^3\cos(2a+3b) + \frac{5}{16}AB^4\cos(a-4b) +$$
$$\frac{5}{4}AB^4\cos(a-2b) + \frac{5}{4}AB^4\cos(a+2b) + \frac{5}{16}AB^4\cos(a+4b) +$$
$$\frac{15}{8}AB^4\cos(a) + \frac{15}{8}A^4 B\cos(b) + \frac{15}{4}A^2 B^3\cos(b) +$$
$$\frac{5}{4}A^2 B^3\cos(3b) + \frac{5}{8}B^5\cos(b) + \frac{5}{16}B^5\cos(3b) + \frac{1}{16}B^5\cos(5b)$$

$A = A_a(t); B = B_b(t) \rightarrow$ Amplitude Modulation (A.M.)

$a = 2\pi f_a t + \phi_a(t); b = 2\pi f_b t + \phi_b(t) \rightarrow$ carrier plus Phase Modulation (P.M.)

Figure 8

METHOD AND APPARATUS FOR DETECTION OF INTERMODULATION PRODUCTS

CROSS-REFERENCE TO RELATED APPLICATIONS

This application is a continuation of U.S. application Ser. No. 13/584,245, filed on Aug. 13, 2012, which claims the benefit under 35 U.S.C. 119(a) and 37 CFR 1.55 to UK patent application no. 1208921.5, filed on May 21, 2012, the disclosure of each of which is hereby incorporated by reference in its entirety.

BACKGROUND OF THE INVENTION

1. Field of the Invention

The present invention relates generally to detection of interference due to intermodulation products of transmitted signals in a wireless system, and more specifically, but not exclusively, to detection of Passive Intermodulation (PIM).

2. Description of the Related Technology

Intermodulation products may be generated in a wireless system when two or more signals are transmitted at different frequencies along a signal path including a component having a non-linear transmission characteristic; these products differ in frequency from the signals from which they were generated, and may potentially cause interference to other signals. The generation of intermodulation products is becoming a problem of increasing importance in modern wireless communication systems, and in particular cellular wireless systems, since the radio frequency spectrum available has been steadily expanded as additional bands have become available, and the pattern of allocation of uplink and downlink bands within the available spectrum for use by various cellular systems, such systems using GERAN (GSM EDGE Radio Access Network), UTRAN (UMTS Terrestrial Radio Access Network) and E-UTRAN (Evolved UMTS Terrestrial Radio Access Network) radio access networks, and by various operators, is complex and territorially dependent. In this environment, and in particular at a cellular radio base station, it is likely that circumstances arise in which intermodulation products generated from transmitted carriers in one or more downlink bands would fall within an uplink band in which signals are received at the base station. Intermodulation generated by non-linear characteristics of active components such as power amplifiers may generally be dealt with at a design stage by appropriate frequency management and filtering, but intermodulation caused by non-linear characteristics of passive components, so called passive intermodulation (PIM), may prove more difficult to manage. Many passive components may exhibit a non-linear transmission characteristic to some degree, for example due to an oxide layer at a metal to metal contact, and the non-linear characteristic may develop with time as an ageing process of the component. Furthermore, PIM may be caused by components in the signal path between the transmitter and the receiver that are external to the transceiver equipment and which may be outside the operator's control, such as metallic objects on the antenna tower or other objects in the signal path through the propagation environment, such as fences; this is known as the "rusty bolt" effect.

Interference due to PIM may reduce the carrier to interference ratio at a receiver, which may reduce coverage by a cell significantly. As a solution to the problem of suspected interference caused by PIM in a cellular radio network, the source of the PIM may be tracked down by field engineers and a component causing the PIM may be replaced. However, it is typically difficult to distinguish the effects of interference due to PIM from other types of interference, such as interference from neighbouring cells, and from other types of degradation of receiver performance, such as a raised noise floor. Detecting and tracking down PIM is particularly difficult if the PIM is generated in the propagation environment, especially if the interference due to PIM is an intermittent fault, for example being dependent upon weather conditions.

PIM may be conventionally detected and tracked down using test equipment which generates PIM by transmitting high power sinewave test signals and which uses a sensitive receiver to detect the presence of PIM by tuning to frequencies at which intermodulation products of the signals may be expected, and detecting an increase in received power when the test signals are transmitted. However, such systems are intrusive, in that they involve the transmission of test signals which may disrupt the normal operation of the wireless network, and they typically require that a received channel of interest, in which intermodulation products are to be detected, should be an unoccupied channel.

Aspects of the invention address at least some of the limitations of the prior art detection systems.

SUMMARY

In a first exemplary embodiment of the invention, there is a method of detecting interference in a wireless network, the interference comprising an intermodulation product of at least a first signal and a second signal, the method comprising:

generating, on the basis of at least the first signal and the second signal, at least one interference signal comprising a simulated intermodulation product;

correlating said at least one interference signal with a waveform received in the wireless system to produce data representing a correlation; and detecting the presence of an intermodulation product of at least the first signal and the second signal in the interference in dependence on the data representative of the correlation.

This has an advantage that an intermodulation product may be detected even in cases where the received waveform comprises a received signal, such as a cellular radio signal, at a higher level than the interference. The data representative of the correlation, such as a correlation magnitude, may be based on a correlation that is accumulated over time to increase the probability of detection and reduce the probability of false alarm. The presence of a specific intermodulation product may be identified by correlation. Furthermore, the method has the advantage of being non-intrusive, that is to say the detection may be based on the use of existing signals within the wireless network and need not involve the transmission of test signals that may disrupt the normal operation of the wireless network.

In a second exemplary embodiment of the invention there is apparatus for detecting interference in a wireless network, the interference comprising an intermodulation product of at least a first signal and a second signal, the apparatus comprising:

at least one processor;

and at least one memory including computer program code;

the at least one memory and the computer program code being configured to, with the at least one processor, cause the apparatus to at least:

generate, on the basis of at least the first signal and the second signal, at least one interference signal comprising a simulated intermodulation product;

correlate said at least one interference signal with a waveform received in the wireless system to produce data representing a correlation; and detect the presence of an intermodulation product of at least the first signal and the second signal in the interference in dependence on the data representative of the correlation.

Further features and advantages of the invention will be apparent from the following description of preferred embodiments of the invention, which are given by way of example only.

BRIEF DESCRIPTION OF THE DRAWINGS

FIG. 7 shows a mathematical expansion describing the generation of intermodulation products by mixing between three signals due to a power (exponent) of 3 term in a non-linear transfer function.

FIG. 8 shows a mathematical expansion describing the generation of intermodulation products by a power (exponent) of 5 term in a non-linear transfer function.

DETAILED DESCRIPTION OF CERTAIN INVENTIVE EMBODIMENTS

By way of example, embodiments of the invention will now be described in the context of detection of interference caused by passive intermodulation (PIM) in cellular wireless networks such as GSM, 3G (UMTS) and LTE networks comprising GERAN, UTRAN and/or E-UTRAN radio access networks, but it will be understood that embodiments of the invention may relate to other types of radio access network, for example IEEE 802.16 WiMax systems, and that embodiments of the invention are not restricted to cellular wireless systems. Furthermore, embodiments of the invention may also relate to detection of interference caused by intermodulation in active components.

Figure 1:
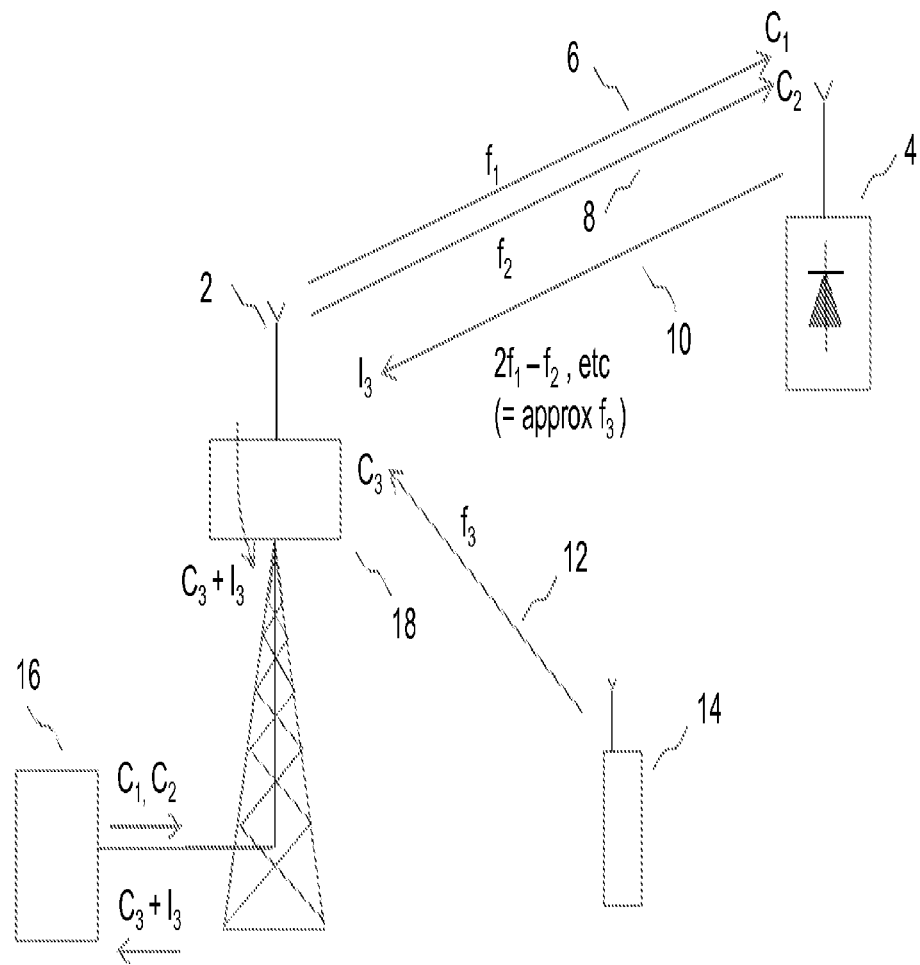
FIG. 1 is a is schematic diagram illustrating an example of interference caused by passive intermodulation.

FIG. 1 shows an example of interference to a received signal in a cellular wireless network. A first downlink signal $C_1$ and a second downlink signal $C_2$, typically carrying payload data, are sent at baseband from a base station modem unit 16 to a Remote Radio Head (RRH) unit 18 as sample streams on a data link such as a Common Public Radio Interface (CPRI) data link. The data link carries both uplink and downlink CPRI data streams. The base station modem unit may be referred to as a baseband unit, and is typically, although not necessarily, mounted in a cabinet on the ground. The Remote Radio Head comprises upconverter and downconverter units and is typically, but not necessarily, mounted on a tower at the base station next to the antenna 2 or antennas. The first and second signals $C_1$ and $C_2$ are upconverted to radio frequency and are transmitted, typically as carriers of the cellular wireless network, at frequencies $f_1$ 6 and $f_2$ 8 respectively. In the example shown in FIG. 1, the first and second signals impinge upon a source of passive intermodulation (PIM) 4, for example a metallic component having an oxide layer between metallic parts or comprising a ferromagnetic material. Intermodulation products of the first signal and the second signal are generated due to the non-linear response of the source of PIM 4.

Figure 2:
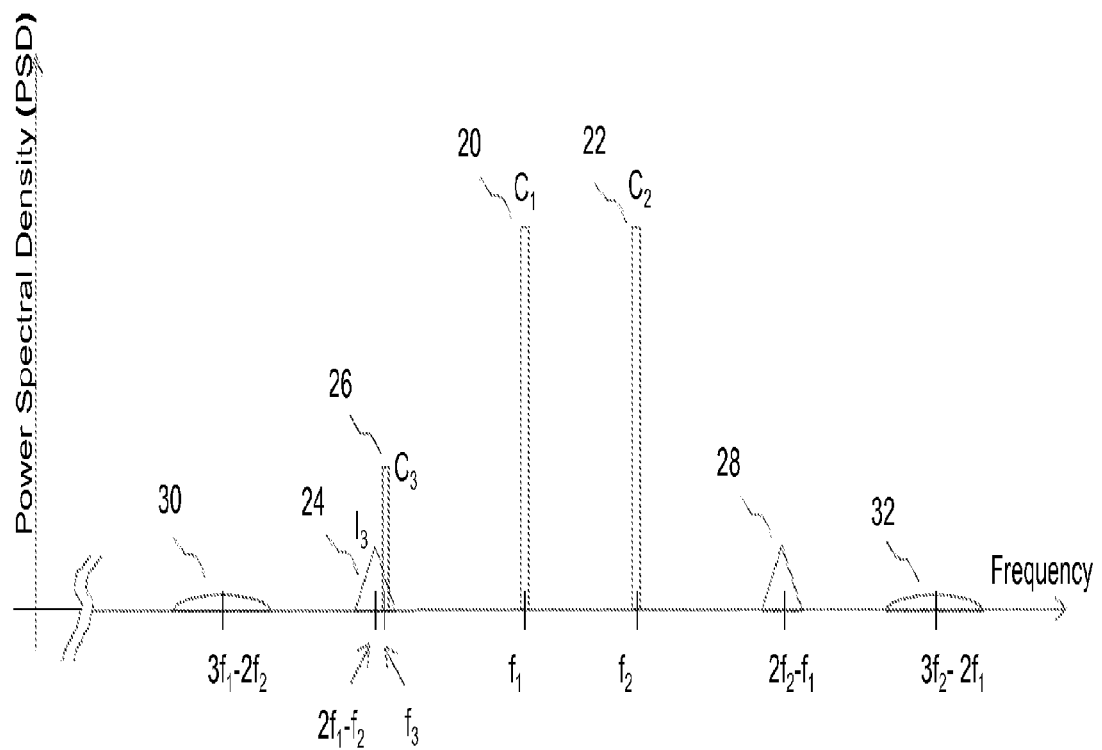
FIG. 2 is a schematic diagram illustrating intermodulation products in the frequency domain.

FIG. 2 shows intermodulation products in the frequency domain. It can be seen that the first signal 20 at frequency $f_1$ and the second signal 22 at frequency $f_2$ may produce, for example, third order products 24, 28 at frequencies $2f_1-f_2$ and $2f_2-f_1$, and fifth order products 30, 32 at frequencies $3f_1-2f_2$ and $3f_2-2f_1$. Other products (not shown) may also be generated.

In the case illustrated by FIG. 2, an uplink signal, i.e. a received signal $C_3$ 26 at frequency $f_3$ falls within the frequency spectrum occupied by the low side third order intermodulation products 24. It can be seen that there is typically an offset between the frequency of the received signal 26 and the centre of the frequency spectrum occupied by the low side third order intermodulation products 24, since there is typically no reason to expect the frequencies to be equal. The intermodulation products typically occupy a broader band than the signals from which they are generated, and there may be more than one received signal falling within the spectrum occupied by the intermodulation products.

Referring again to FIG. 1, it can be seen that intermodulation products $I_3$ of the first and second signals are transmitted 10 from the PIM source 4, in this example at $2f_1-f_2$. The intermodulation products $I_3$, in this example, fall at least in part, within a received uplink channel at $f_3$ and appear as interference to a received signal $C_3$ that is transmitted 12 at radio frequency from, for example, a user equipment 14 in communication with the base station. The received signal $C_3$ and the intermodulation products $I_3$ appearing as interference to the received signal are typically downconverted to baseband in the RRH 18 and sent on the data link to the baseband/modem unit 16.

Figure 3:
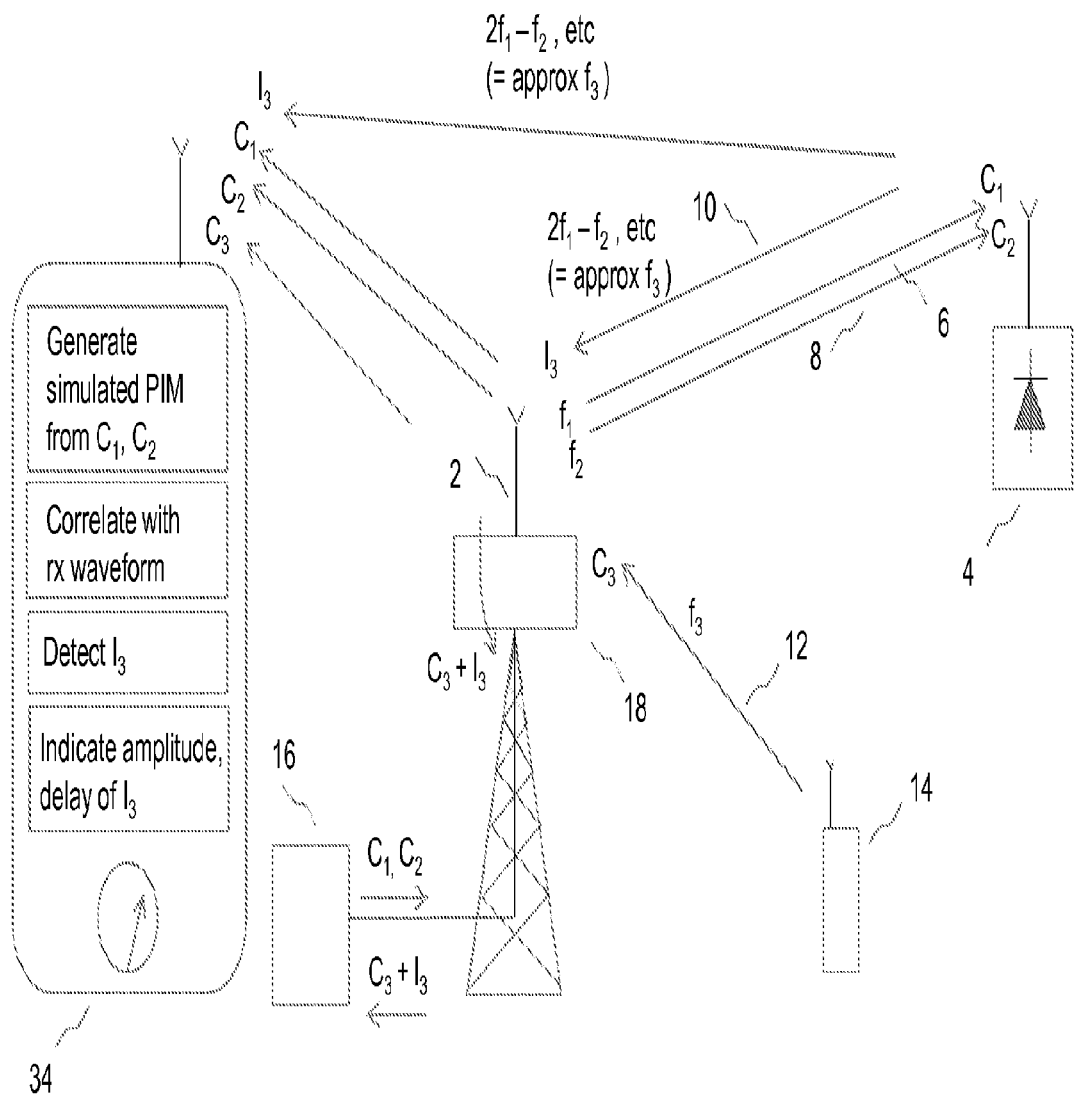
FIG. 3 is a schematic diagram illustrating detection of interference caused by passive intermodulation, where the passive intermodulation is generated in a component external to the transmitter in embodiment of the invention, where the detector is a hand held device having an antenna.

FIG. 3 shows an embodiment of the invention, in which interference caused by passive intermodulation is detected by a PIM detector device 34, which in this example is a hand held device having an antenna. Similarly to the situation shown in FIG. 1, an interference signal comprises an intermodulation product $I_3$ of at least a first signal $C_1$ and a second signal $C_2$ generated in a component 4 external to the transmitter. The PIM detector 34 receives a received waveform in a channel of interest, that may also contain a received uplink signal $C_3$ and interference comprising the intermodulation product $I_3$. The PIM detector also receives the first signal $C_1$ and a second signal $C_2$, which in this case are transmitted from the base station antenna 2. The PIM detector generates, on the basis of at least the first signal and the second signal, at least one interference signal comprising a simulated intermodulation product. The PIM detector may select the first signal $C_1$ and a second signal $C_2$ on the basis of a determination of which downlink signal frequencies may produce intermodulation products that may fall within the channel of interest that carries the received waveform, based on well known relationships between signal frequencies and the frequencies of intermodulation products produced from those frequencies. On the basis of this determination, the appropriate first and second downlink signals $C_1$ and $C_2$ may be selected for generation of simulated intermodulation products. The order of the product that is generated may also be selected on the basis of which intermodulation products would be expected to fall in the channel of interest. The PIM detector then correlates the interference signal with the waveform received to produce data representing a correlation, for example a magnitude of a correlation. The presence of an intermodulation product of at least the first signal and the second signal is detected in the interference in dependence on the data representative of the correlation, for example by comparing the data representative of the correlation, for example the magnitude of the correlation, with a predetermined threshold. An appropriate probability of detection and false alarm rate may be selected by selection of the predetermined threshold. An indication may be provided that interference has been detected, on the basis of the detecting of the presence of the intermodulation product of at least the first signal and the second signal, so that, for example, an operator may be alerted to the presence of intermodulation products, so that remedial action may be taken.

The indication may be automatically logged, or used to activate another apparatus such as an interference canceller that may be arranged to combine the at least one interference signal comprising a simulated intermodulation product with the received waveform in antiphase to the intermodulation product in the interference in order to reduce or cancel the interference. The indication may indicate specifically that an intermodulation product has been detected, and may indicate, for example, the order of the product and the signals from which it is derived. If it is determined that more than one intermodulation product may fall in the channel of interest, each product may be generated and detected sequentially.

By this method, intermodulation products may be detected even in cases where the received waveform comprises a received signal, such as a cellular radio signal, which may be at a higher level than the interference. The data representative of the correlation, such as a correlation magnitude, may be based on a correlation that is accumulated over time to increase the probability of detection and reduce the probability of false alarm. The method has the advantage of being non-intrusive, that is to say the detection may be based on the use of existing signals within the wireless network and need not involve the transmission of test signals that may disrupt the normal operation of the wireless network.

Figure 4:
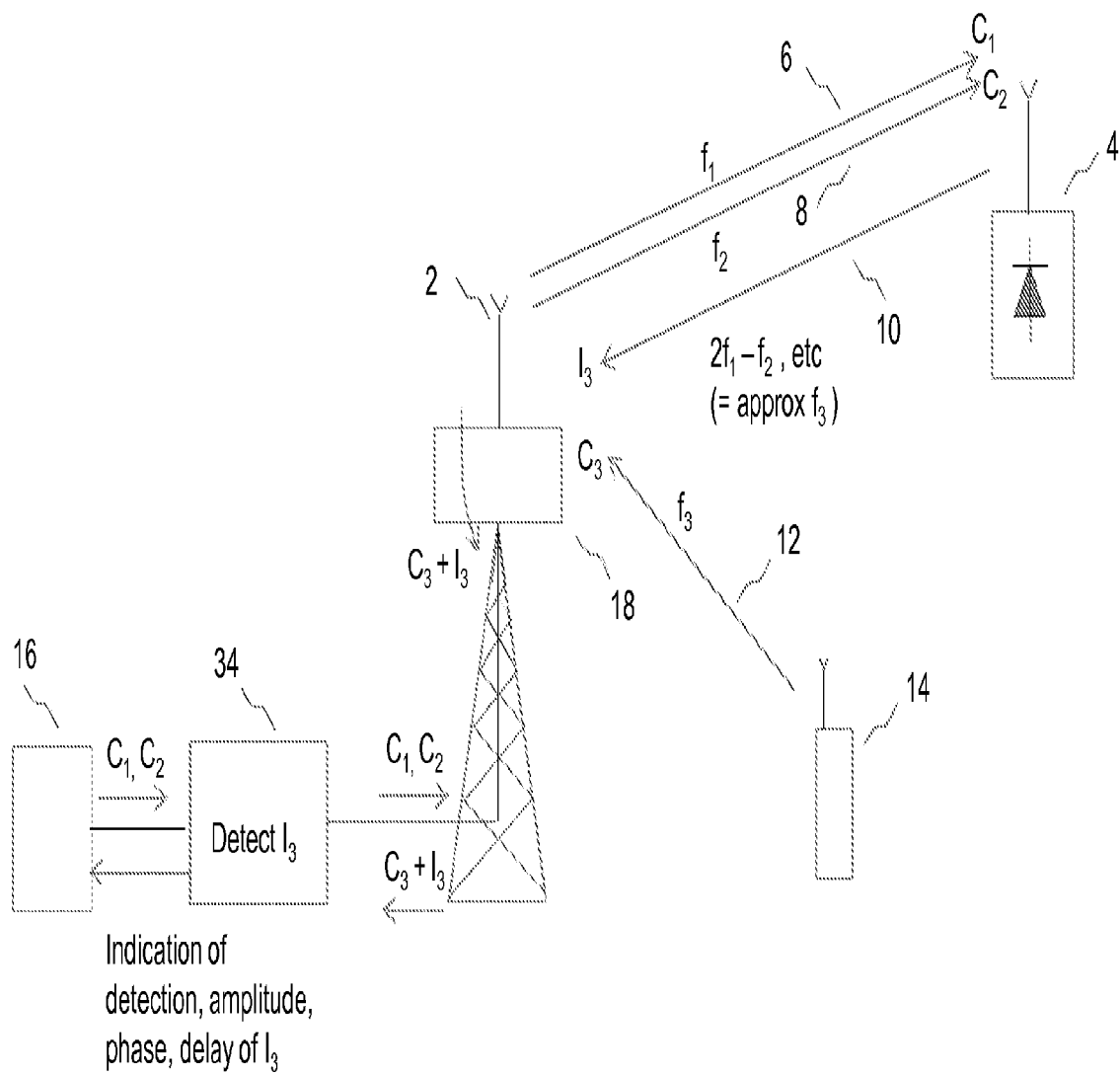
FIG. 4 is a schematic diagram illustrating detection of interference caused by passive intermodulation, where the passive intermodulation is generated in an component external to the transmitter in embodiment of the invention, where the detector is connected to a data link between a base station and a radio head unit.

FIG. 4 shows an alternative embodiment of the invention, again applied to the situation of FIG. 1, in which the PIM detector 34 is inserted into the data link, typically the CPRI link, between a base station modem unit and a radio head unit. For example, the apparatus may be retro-fitted in an existing installation as an appliqué unit, by breaking into the existing data link and connecting the apparatus in series with the data link. In this case, the indication of detection, and also other parameters such as the amplitude, phase and delay of the intermodulation product may, for example, be sent to the baseband unit 16. They may alternatively be logged internally in the PIM detector for later analysis, or communicated via a data connection to a network operations centre (NOC) or an operator. In the embodiment shown in FIG. 4, the apparatus may comprise a first interface, typically a CPRI interface, for connection to the base station modem unit and a second interface, also typically a CPRI interface, for connection to the radio head unit, the first interface being arranged to receive downlink data representing at least the first signal and the second interface being arranged to receive uplink data representing at least the received waveform.

Figure 5:
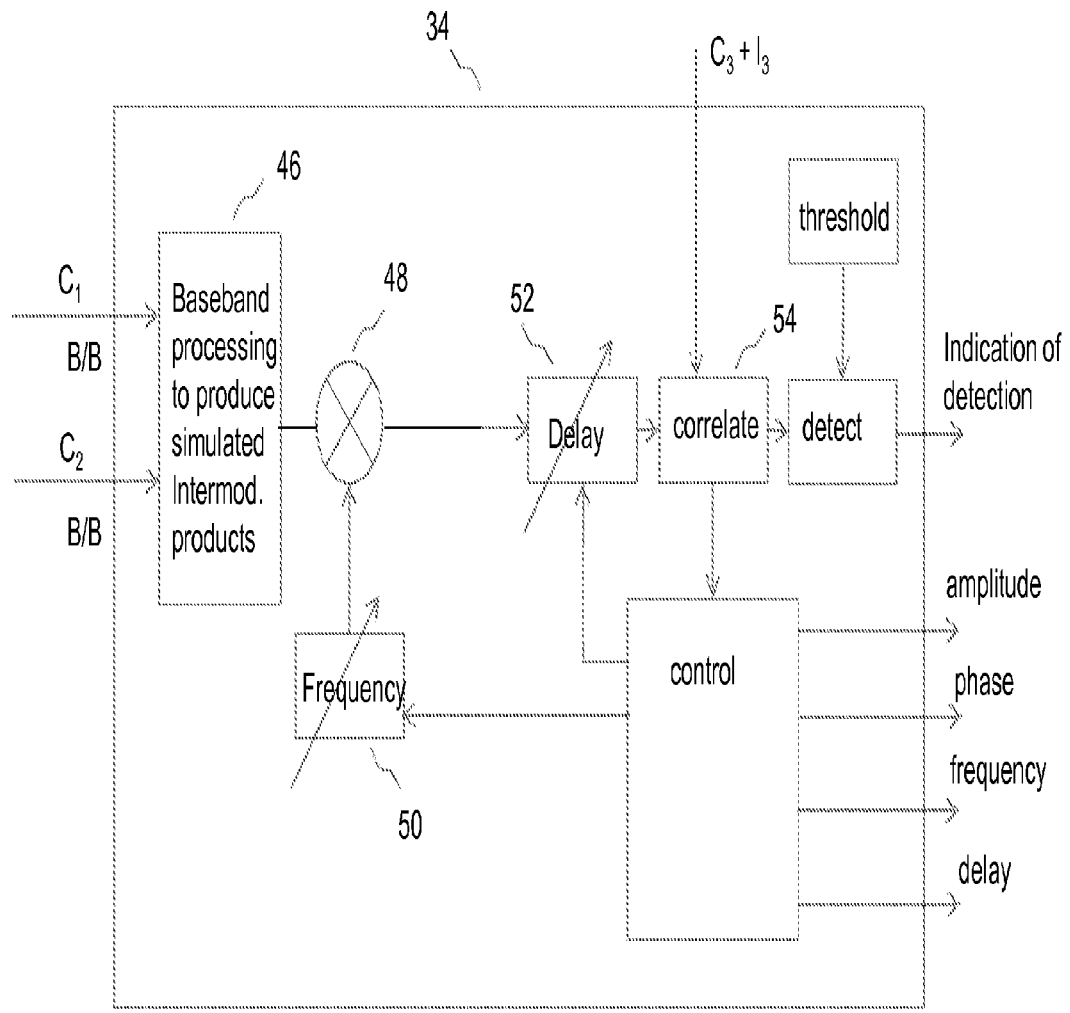
FIG. 5 is schematic diagram showing apparatus for detection of interference on a single receive channel caused by passive intermodulation in an embodiment of the invention.

FIG. 5 shows the PIM detector 34 in more detail, showing an example of an arrangement for detection of interference to a received waveform on a receive channel caused by intermodulation products of at least the first signal and the second signal, the first and second signals being downlink signals. The first and second signals $C_1$ and $C_2$, as shown in FIG. 4, are received at baseband at the apparatus, for example from the data link from the base station modem unit. On the basis of the first signal and the second signal, simulated intermodulation products are generated 46. In the embodiment shown, the simulated intermodulation products are delayed 52 by a plurality of delay values to generate a plurality of delayed interference signals comprising simulated interference products. In other embodiments, a plurality of delays may be used to generate the plurality of delayed interference signals by applying delays to one or both of the first and second signals before simulated intermodulation products are generated. The received waveform, which may comprise a received signal $C_3$ having interference comprising intermodulation products $I_3$ of at least the first signal and the second signal is received at the PIM detector, for example from the uplink data link at baseband as shown in FIG. 5 as $C_3+I_3$. Each of the delayed interference signals is correlated with the received signal to produce a data representing a correlation 54 for each delayed interference signal. The data representing a correlation may be, for example, the magnitude of the correlation.

Then, at least one delay value is selected from the plurality of delay values in dependence on the data representative of the correlations; for example, the delay value may be selected that resulted in the greatest correlation magnitude. An indication of the selected delay value and frequency may be output from the detector. Also, an indication of amplitude and phase values derived from data representing the correlation may be output from the detector. In an alternative implementation, the variable delay 52 may not be implemented; for example, a fixed delay value may be set up, or a delay may not be necessary.

The delay values from which a delay value is selected may be arranged to cover an expected range of delay values. For example, the range of delay values may be round trip delay values from a source of the first and/or second signals via a source of intermodulation products to the apparatus. The plurality of delays may have, for example, a range of values greater than 100 ns, and a range values greater than 200 ns may be advantageous. The delay values may be relative to the delay value of a direct path from the source of the first and/or second signals to the apparatus, the direct path being used to provide samples of the first and second signals at the apparatus. The source of the intermodulation products may be a source of passive intermodulation (PIM), which may be in the transmitter equipment, in the receiver equipment, or outside the transmitter or receiver in the propagation path at a typically unknown location, so that a wide range of delay values may be possible.

The processing of the first signal and the second signal at baseband to produce baseband intermodulation products may be carried out as follows. Consider, for example, generation of power (exponent) 3 intermodulation products of two signals, having amplitude modulation A and B respectively, and a phase comprising carrier phase and phase modulation a and b respectively. Exponent 3 intermodulation products are given by:

$$(A\cos(a)+B\cos(b))^3$$

which may be expanded to give:

$$\frac{1}{4}(3A^3\cos(a) + A^3\cos(3a) + 3A^2B\cos(2a-b) +$$
$$3A^2B\cos(2a+b) + 3AB^2\cos(a-2b) + 3AB^2\cos(a+2b) +$$
$$6AB^2\cos(a) + 6A^2B\cos(b) + 3B^3\cos(b) + B^3\cos(3b))$$

The terms of the expansion which are of interest, in that they may fall in an uplink receive band, are the terms 3 $A^2B$ cos(2a−b), which represents the lower third order product as shown in FIG. 2 as $I_3$ as indicated by reference numeral 24, and 3 $AB^2$ cos(a−2b), which may also be written as 3 $AB^2$ cos(2b−a), which represents the upper third order product as shown as indicated in FIG. 2 by reference numeral 28. Which of the 'upper' or 'lower' products falls in an uplink receive band will depend upon whether the uplink band is allocated above or below the downlink band. The mathematics above shows that the intermodulation products contain amplitude and phase modulation which is a function of modulation of the first and second signals which generated the intermodulation products, and that baseband intermodulation products may be generated in the PIM detector from the knowledge of the amplitude and phase of the first and second signals; this information is available in a baseband representation of the first and second signals.

However, it may be necessary to frequency shift the intermodulation products generated at baseband to produce the simulated intermodulation products suitable for cancelling interference in the received signal, so that simulated intermodulation products are aligned in frequency with the intermodulation products in the interference to the received signal. This is because, as shown in FIG. 2, the centre frequency of the intermodulation products interfering with the received signal may not correspond with the centre frequency of the received uplink channel of the received signal, but may be offset by an offset frequency.

FIG. 5 shows frequency shifting of the baseband intermodulation products, as represented by mixing function 48 and offset frequency calculation function 50. The frequency shifting comprises shifting by a frequency determined by at least a frequency of a channel in which the received signal is received, a frequency of the first radio frequency signal, and a frequency of the second radio frequency signal.

There may also be a need, in some embodiments, to adjust the frequency of the frequency shift by a correction factor, which may be a correction, also known as a fine frequency adjustment, applied in addition to the frequency shift determined by calculation from knowledge of the frequency of a channel in which the received signal is received, the frequency of the first radio frequency signal, and the frequency of the second radio frequency signal. The frequency shifting may comprise shifting by a frequency determined by adjusting the frequency shift to a plurality of frequency shift values and selecting a frequency for the frequency shifting shift on the basis of data representing a correlation of a delayed interference signal with the received signal for each of the plurality of frequency shift values. So, for example, the frequency shift may be selected that gives the largest correlation magnitude. In this way, a frequency shift value may be adjusted to remove an unknown component to the offset between the frequency of the channel in which the received signal is received and the frequency of the intermodulation products in the interference to the received signal. The unknown component to the frequency offset may, for example, be caused if the precise frequency relationship between frequencies used to upconvert the first and/or second signals and the frequency used to downconvert the received signal is not known.

Figure 6:
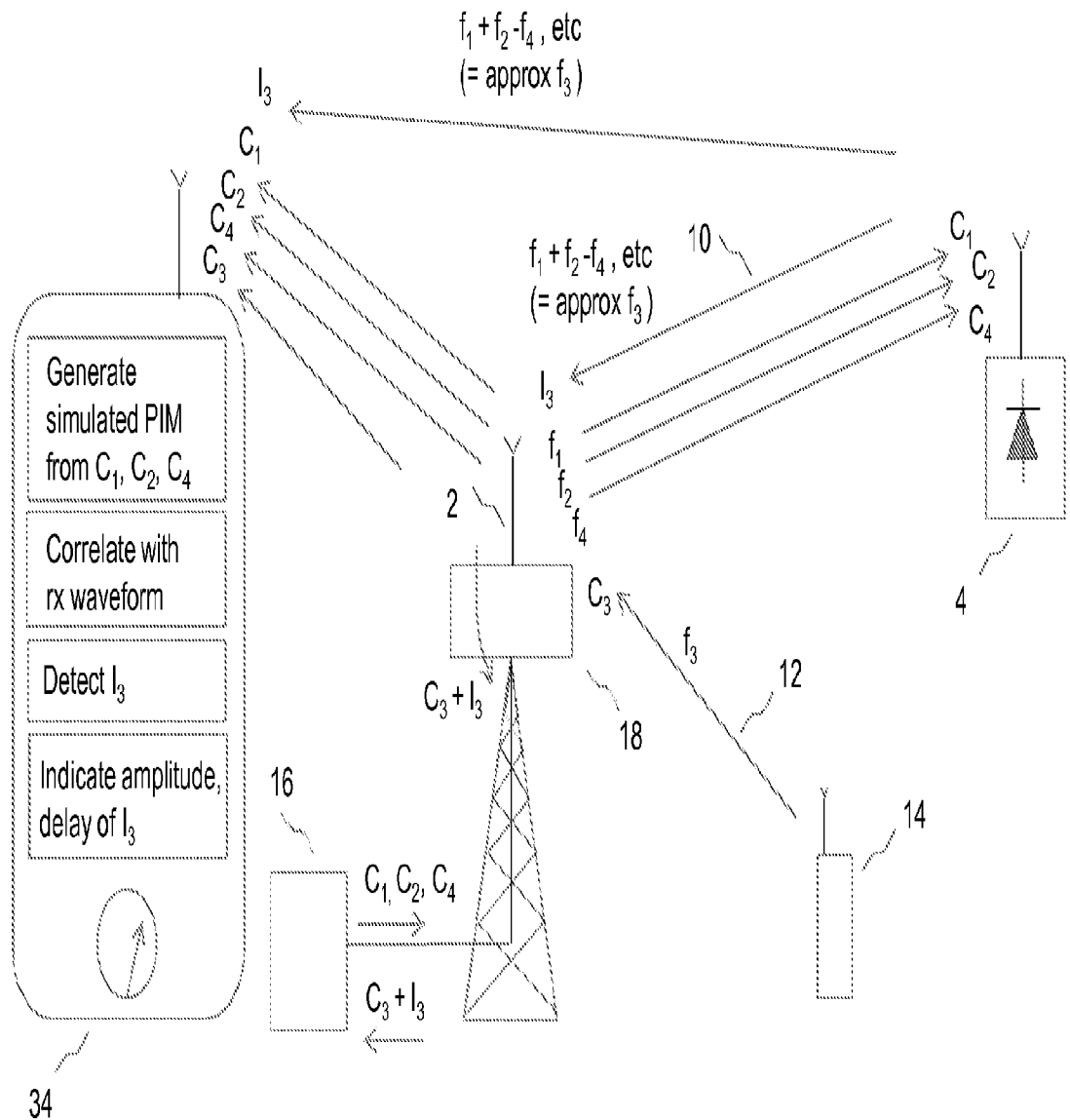
FIG. 6 is a schematic diagram illustrating detection of interference caused by passive intermodulation, where the passive intermodulation is generated by mixing between three signals in a component external to the transmitter in embodiment of the invention.

FIG. 6 illustrates that intermodulation products may be generated in a non-linear device by the mixing of three or more signals. In FIG. 6, three carriers C1, C2 and C4, that is to say signals, are transmitted at frequencies f1, f2, and f4 respectively. As shown, these may mix together in the PIM source 4 to produce third order products such as f1+f2−f4, that may fall within a receive band. Simulated intermodulation products may be generated by knowledge (or guessing) of the process by which the intermodulation products in interference to a receive signal are generated. FIG. 7 is an example of a mathematical expansion showing the generation of intermodulation products of a first, second and third signal by a power (exponent) 3 term (i.e. a 'cubic' term) of a non-linear device characteristic. The terms within broken lines have been highlighted as terms that may typically fall within a receive band in some arrangements of cellular radio uplink and downlink frequencies. At least one interference signal may be generated comprising a simulated intermodulation product on the basis of the first signal, the second signal and the third signal.

The generation of simulated intermodulation products was described in connection with FIG. 5 as the generation of third order terms at baseband in order to cancel intermodulation products generated by cube (exponent 3) terms in the transfer characteristic of a non-linear device. However, in addition to the generation of third order intermodulation products by cube terms in a device transfer function, intermodulation products may also be generated at the frequencies expected for third order products, such as $2f_1-f_2$ and $2f_2-f_1$, by terms in a device transfer function of powers 5, 7, 9, and potentially by any odd power device nonlinearities, where the power (or exponent) is at least as great as the power of the respective term of the device transfer function. Correspondingly, intermodulation products normally termed as 'fifth order' can actually be generated by device nonlinearities of powers 5, 7, 9, . . . and all higher odd power device nonlinearities. The pattern continues in this way for all higher (odd) order intermodulation products (i.e. 'seventh', 'ninth' etc.), which can be generated not only by device nonlinearities of the same power, but also by device nonlinearities of higher odd powers. FIG. 8 shows a mathematical expansion illustrating the generation of intermodulation products by a fifth power term in a device transfer function. The terms within broken lines have been highlighted as terms that may typically fall within a receive band in some arrangements of cellular radio uplink and downlink frequencies. In particular, the terms include $\cos(2a-b)$, and $\cos(a-2b)$, which correspond to the frequencies $2f_1-f_2$ and $2f_2-f_1$. Therefore, it may be seen that knowledge (or guessing) of the mechanism for generating intermodulation products may be used to generate corresponding simulated intermodulation products.

Figure 9:
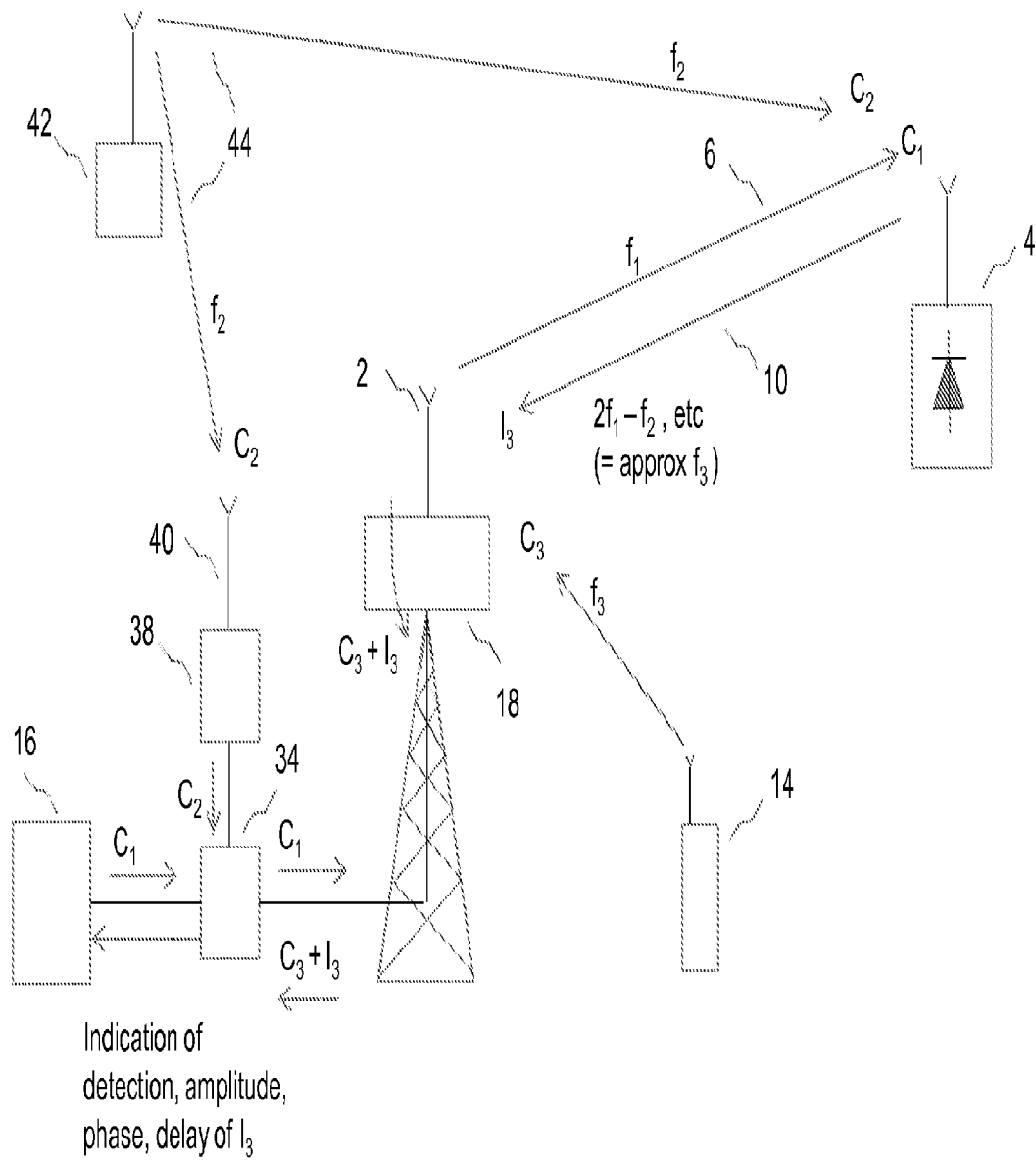
FIG. 9 is a schematic diagram illustrating detection of interference caused by passive intermodulation, where one of the signals that generated the passive intermodulation is received by an antenna and passed to the detector in an embodiment of the invention.

FIG. 9 shows the case where an antenna 40 is provided for receiving at least the second signal, so that at least the second signal may be received if a downlink datastream comprising at least the second signal is not available. For example, the second signal may originate from equipment 42 that does not share the same remote radio head 18 as the first signal. The second signal may be a signal used by a different operator from the operator of the first signal and the received signal. In one embodiment of the invention, a single antenna may be used to receive both the first and second signals, for example in the case that neither the first nor the second signal is available in a CPRI interface. Alternatively, the apparatus may comprise a further antenna for receiving at least the first signal. A directional antenna may be used for receiving each of the first and second signals in the case that the source of the first and second signals is at a different direction with respect to the apparatus.

The apparatus may comprise a receiver 38 arranged to receive at least the second signal from the antenna and to provide a baseband representation of the second signal for use in generating the interference signal comprising simulated intermodulation products, so that a baseband representation of the second signal may be provided in cases where access is not available to a data link on which the baseband representation of the second signal is available. It may be that the first signal is available from a data link but the second signal is not. In an alternative embodiment, the apparatus may further comprise a second receiver arranged to receive at least the first signal from the antenna and to provide a baseband representation of the first signal for use in generating the interference signal comprising simulated intermodulation products.

Figure 10:
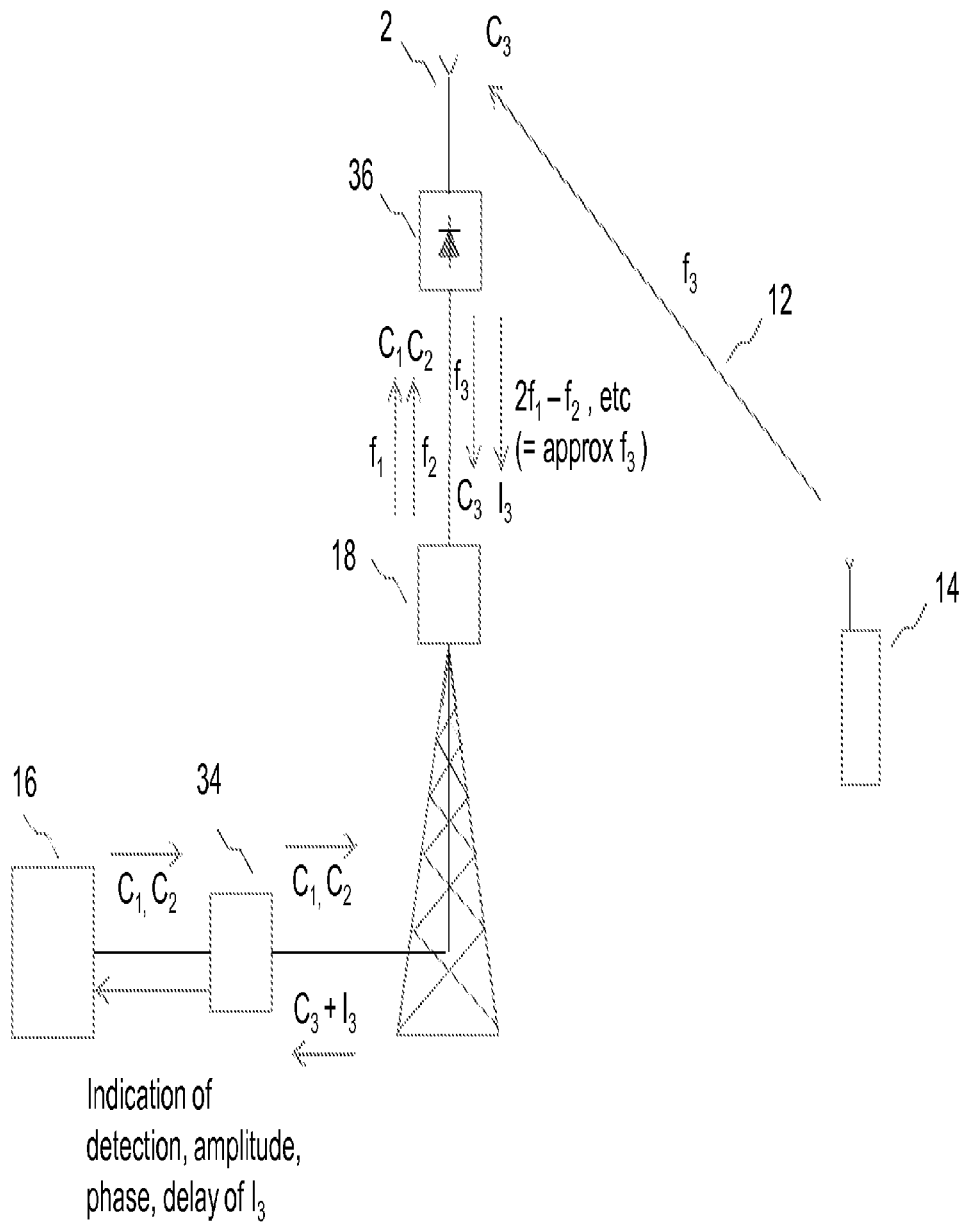
FIG. 10 is a schematic diagram illustrating detection of interference caused by passive intermodulation, where the passive intermodulation is generated in the signal path of the transmitter in an embodiment of the invention.

FIG. 10 shows an application in which the intermodulation products causing interference to the received signal are generated within the transceiver at the base station, for example passive intermodulation (PIM) in the diplexer or antenna or active intermodulation in an active component. However, provided that the appropriate delays are available for selection for use in generating the interference signal comprising simulated intermodulation products, the interference may be detected as previously described for the case of the external PIM source.

Figure 11:
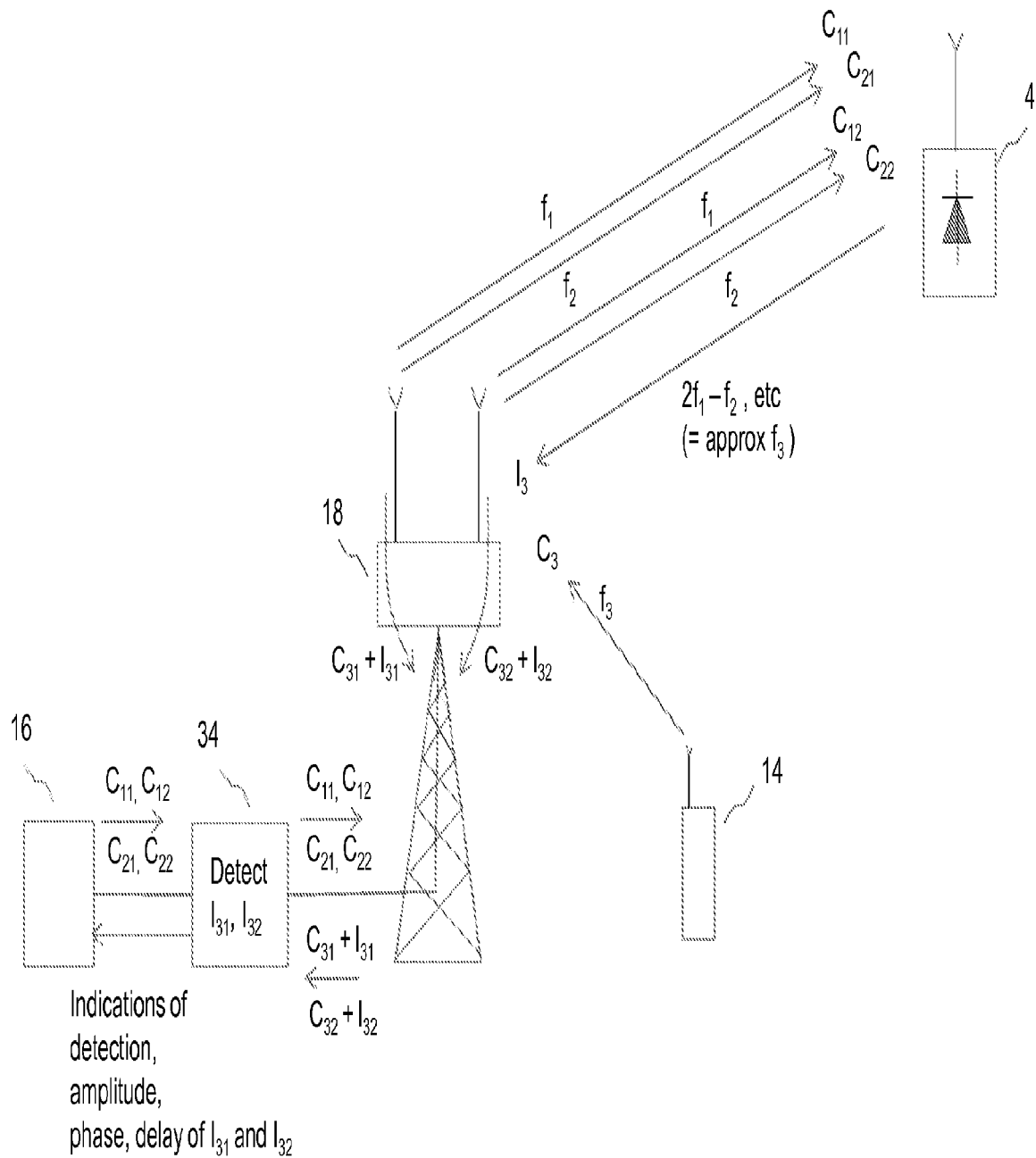
FIG. 11 is a schematic diagram illustrating detection of interference caused by passive intermodulation in an embodiment of the invention in a wireless system using MIMO transmission and reception in an embodiment of the invention.

FIG. 11 shows an embodiment of the invention in a wireless network using MIMO (Multiple Input Multiple Output) transmission and reception. As shown in FIG. 11, the base station transmits and receives using multiple antennas; in this example, two antennas are shown, but more than two may be used. As shown in FIG. 11, a first signal transmitted at a frequency $f_1$ may have two MIMO components $C_{11}$, $C_{12}$, each carrying a MIMO data stream, each transmitted from a different antenna. Also, a second signal transmitted at a frequency $f_2$ may also have two MIMO components $C_{21}$, $C_{22}$, also each carrying a MIMO data stream, each transmitted from a different antenna than the other data stream. If the components of the first and second signals impinge upon a PIM source 4, PIM signals may be generated from the first and second signals. However, in order to simulate the PIM signals that are generated, it is necessary to know the relative amplitudes and phases of the components of each signal, and also the delay of each component, at the PIM source. This is because it is the superposition i.e. the vector sum, of the components of the first signal that interacts with the superposition of the components of the second signal to generate the PIM intermodulation products, shown as $I_3$ in FIG. 11.

A received signal $C_3$ is received at the base station at a frequency which falls within the spectrum occupied by the PIM intermodulation products. However, as shown in FIG. 11, the received signal is received by two antennas at the base station, as components $C_{31}$ and $C_{32}$, and similarly the PIM intermodulation products are received on two antennas, as components $I_{31}$ and $I_{32}$.

Figure 12:
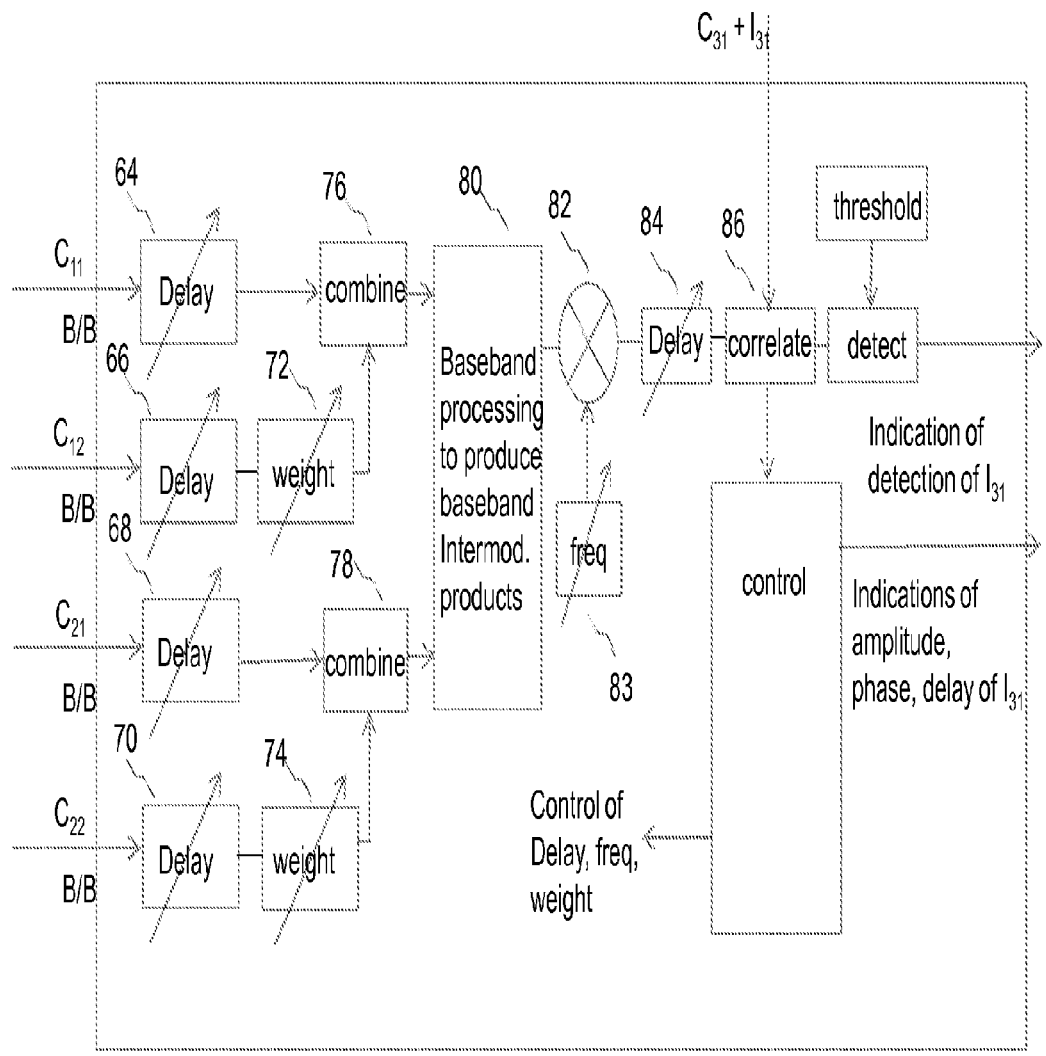
FIG. 12 is schematic diagram illustrating apparatus for detection of interference on a single received MIMO stream caused by passive intermodulation between two signals each having two MIMO components in an embodiment of the invention.

FIG. 12 shows interference detection apparatus, which may be referred to as a PIM detector, for the MIMO case. Only one receive antenna channel is shown. As can be seen, the MIMO components of the first signal, $C_{11}$, $C_{12}$ obtained for example from the CPRI downstream data, may be adjusted in amplitude and phase by weight 72 and adjusted in delay 64, 66 and then combined for input to the baseband processing function 80. Similarly, the MIMO components of the second signal, $C_{21}$, $C_{22}$ obtained for example from the CPRI downstream data, are adjusted in amplitude and phase by weight 74 and adjusted in delay 68, 70 and then combined for input to the baseband processing function 80. The processing function generates intermodulation products based on the combined components of the first signal and the combined components of the second signal. An offset frequency is applied to generate interference signals comprising simulated intermodulation products offset from baseband so as to align in frequency the simulated intermodulation products with the interference to the received signal, as previously described in connection with FIG. 5. The generated interference signals are correlated with the received signal and a search is performed over the each of the delay values 64, 66, 68, 70 and weights 72, 74, and, if appropriate, frequency offsets to find the combination of parameters that produces the greatest magnitude of correlation. The presence of intermodulation products may be detected on the basis of data representative of the correlation, such as the magnitude of the correlation. Indications may be provided of the amplitude, phase, delay, and frequency values that produce the greatest magnitude of correlation, since these values may be the best estimate of the respective parameter values for the detected intermodulation products.

In FIG. 12, the adjustable delay blocks are shown for example only; it is not necessary for the delays to be applied sequentially, since different delay values may be tried in parallel, if parallel correlation channels are provided; the two approaches are interchangeable, the choice being a trade off between speed of selection and processing load.

The processing steps involved in the case where the first signal has at least a first component and a second component, each component having been transmitted from a different antenna, are as follows. Delayed interference signals are generated using each of a range of delay values 64 for the first component and a range of delay values 66 for the second component. For each of the delay values of the first component and for each of the delay values for the second component, the respective delayed interference signal is correlated with the received signal to produce data representative of a correlation, such as a correlation magnitude, for each of a range of amplitude values and for each of a range of phase values for the second component, that is to say a range of weight values 72. An amplitude value and a phase value of the second component, a delay value of the first component, and a delay value of the second component is selected in dependence on a comparison of the data representative of the correlations, for example, the values corresponding to the highest magnitude of the correlation may be selected. The interference signal may be generated using the selected amplitude value and selected phase value of the second component, the selected delay value of the first component, and the selected delay value of the second component. The amplitude values and phase values of the second component may be relative values, being relative to the amplitude and phase of the first component. Data representative of the correlation, such as the magnitude of the correlation, corresponding to the selected delays, amplitude and phase values may be used as the basis for detecting the presence of intermodulation products. In addition, the selected values of delays, amplitude and phase may be output in the form of indicators, for example for use by an operator in tracking down PIM, for data logging for future analysis, or for passing to a canceller arrangement for use in cancelling or reducing intermodulation products by combining simulated intermodulation products in antiphase with intermodulation products in a received waveform.

The processing steps involved in the case where the first signal comprises a further component of the first signal having been transmitted from an antenna not used to transmit the first component of the first signal or the second component of the first signal, for example a third MIMO stream, are as follows. Delayed interference signals are generated using, additionally to the case for two MIMO streams, each of a range of delay values for the further component. For each of the plurality of delay values of the first component, for each of the plurality of delay values for the second component, and for each of the plurality of delay values of the further component, the respective delayed interference signal is correlated with the received signal to produce data representative of a correlation, for example a magnitude of the correlation, for each of a plurality of amplitude values and for each of a plurality of phase values for each of the second and further components. An amplitude value and a phase value of each of the second component and the further component is selected and a delay value of the first component, a delay value of the second component and a delay value of the further component is selected in dependence on a comparison of the data representative of the correlations. Typically the parameter values corresponding to the greatest magnitude of the correlation are selected. The interference signal may be generated using the selected amplitude value and the selected phase value of each of the second component and the further component and the selected delay value of the first component, the selected delay value of the second component and the selected delay value of the further component. Data representative of the correlation, such as the magnitude of the correlation, corresponding to the selected delays, amplitude and phase values may be used as the basis for detecting the presence of intermodulation products. In addition, the selected values of delays, amplitude and phase may be output in the form of indicators, for example for use by an operator in tracking down PIM, for data logging for future analysis, or for passing to a canceller arrangement for use in cancelling or reducing intermodulation products by combining simulated intermodulation products in antiphase with intermodulation products in a received waveform.

The processing steps involved in the case where the second signal comprises at least a first component of the second signal and a second component of the second signal, each of the first and second components of the second signal having been transmitted from a different antenna from the antenna used to transmit the other, that is to say, for example, the second signal has two MIMO components are as follows. For each of the plurality of delay values of the first component of the first signal, for each of the plurality of delay values for the second component of the first signal, for each of the plurality of delay values of the first component of the second signal, and for each of the plurality of delay values for the second component of the second signal, the respective delayed interference signal is correlated with the received signal to produce data representative of a correlation for each of a plurality of amplitude values and for each of a plurality of phase values for each of the second component of the first signal and the second component of the second signal. An amplitude value and a phase value of the second component of the first signal and the second component of the second signal is selected and a delay value of the first component of the first signal, a delay value of the second component of the first signal, a delay value of the first component of the second signal, and a delay value of the second component of the second signal is selected in dependence on a comparison of the data representing the correlations. The interference signal is generated using the selected amplitude value and the selected phase value of the second component of the first signal and the second component of the second signal and the selected delay value of the first component of the first signal, the selected delay value of the second component of the first signal, the selected delay value of the first component of the second signal, and the selected delay value of the second component of the second signal. Data representative of the correlation, such as the magnitude of the correlation, corresponding to the selected delays, amplitude and phase values may be used as the basis for detecting the presence of intermodulation products. In addition, the selected values of delays, amplitude and phase may be output in the form of indicators, for example for use by an operator in tracking down PIM, for data logging for future analysis, or for passing to a canceller arrangement for use in cancelling or reducing intermodulation products by combining simulated intermodulation products in antiphase with intermodulation products in a received waveform.

Figure 13:
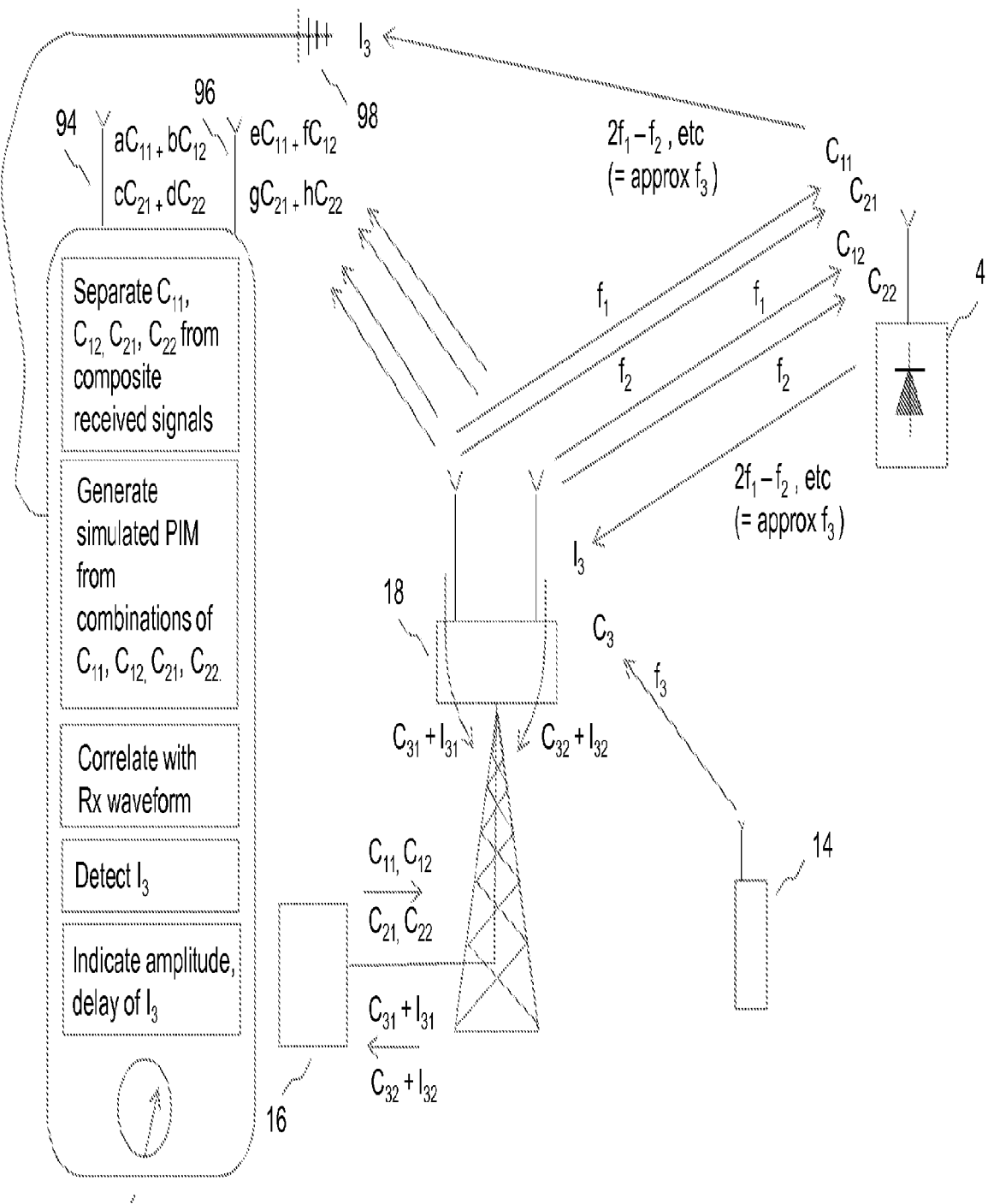
FIG. 13 is a schematic diagram illustrating detection of interference caused by passive intermodulation in a wireless system using MIMO transmission and reception in an embodiment of the invention, in which the detector is a hand held device having multiple antennas.
Figure 14:
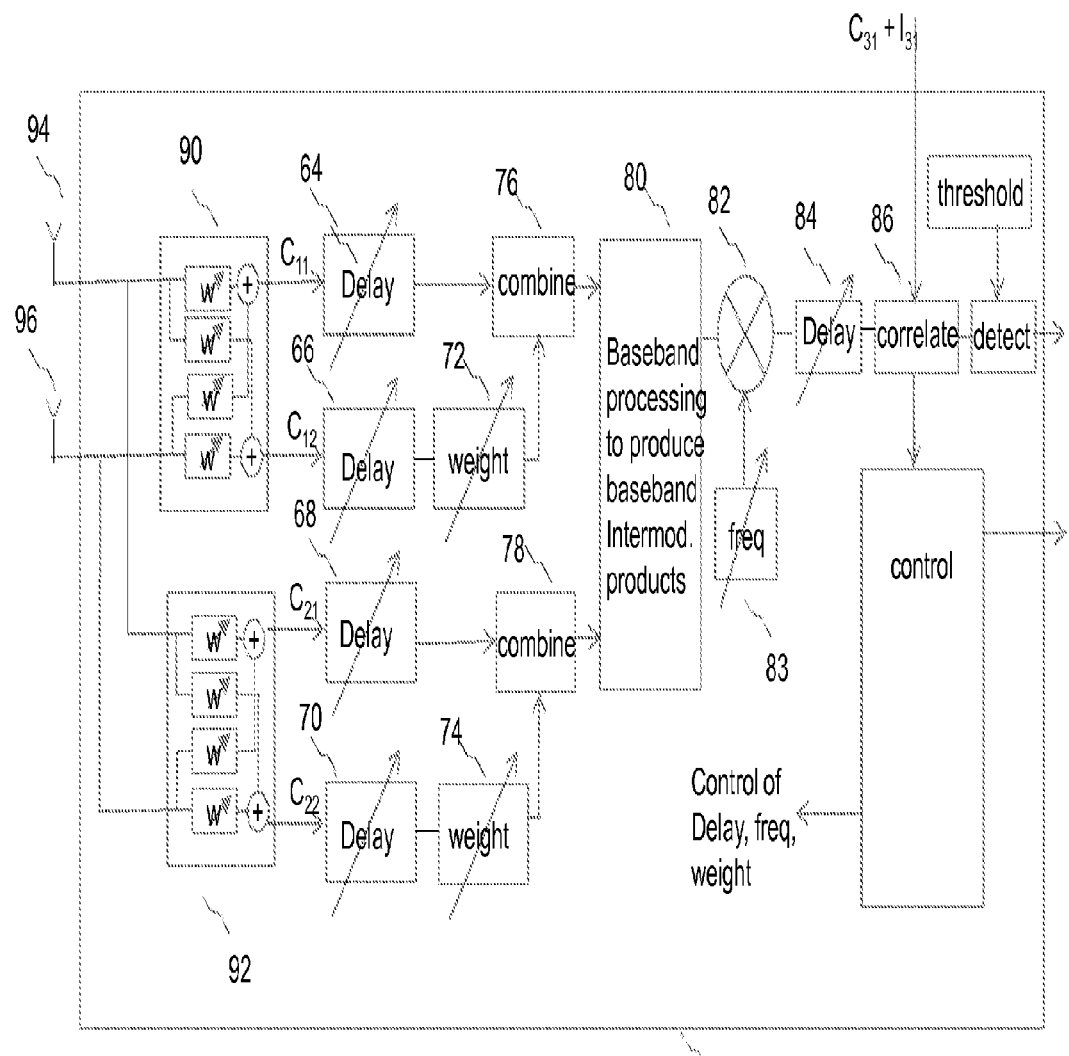
FIG. 14 is schematic diagram illustrating apparatus for detection of interference on a single received MIMO stream caused by passive intermodulation between two signals each having two MIMO components in an embodiment of the invention, in which the MIMO components are received using antennas.

FIG. 13 shows an alternative implementation of an embodiment of the invention, similar to the situation in FIG. 11, except that the PIM detector 34 is a handheld device, and the MIMO components of the first and second signals are received using two or more antennas 94, 96. In FIG. 13, a directional antenna 98 is also shown for receiving the intermodulation products $I_3$. The directional antenna may have a gain that is higher than a gain of an antenna used to receive the first or second signals. In alternative embodiments, the intermodulation products need not be received by a directional antenna; a directional antenna may be a particular advantage when used by an operator to track down a source of PIM. As may be seen in FIG. 13, first and second MIMO components $C_{11}$, $C_{12}$ of the first signal are received in a first complex scalar relationship $aC_{11}+bC_{12}$ at the first antenna 94 and in a second complex scalar relationship $cC_{11}+dC_{12}$ at the second antenna 96, where a, b, c, d are complex scalars representing the different polarisation factors and path lengths to each receive antenna from respective MIMO transmit antennas at the base station (assuming, for simplicity, frequency flat/non-dispersive channels, and using complex baseband representations of signals). As a result, the detector does not have access directly to each transmitted MIMO component. However, as shown in FIG. 13, the MIMO components may be separated from the composite signals received at the antennas 94, 96. For example, as shown in FIG. 14, the composite signals may be connected to a weighting function block 90, 92, in which, for each of frequency $f_1$ and $f_2$, each composite signal is weighted by variable weights w in the arrangement shown in FIG. 14. The weights are controlled such that, when the weighted components are combined, the separate MIMO components are produced. The separate MIMO components may then be processed as described in connection with FIG. 12. The weights of the weighting functions 90, 92 may be determined by a search of weight values, on the basis of the data representing the correlation, for example searching for the highest correlation. Alternatively, the weights may be determined by use of conventional methods to separate the MIMO components, using pilot tones to distinguish the MIMO components. A conventional 'Blind Source Separation' (BSS) signal processing technique, such as 'Independent Component Analysis' (ICA) may also be used to separate the MIMO components.

Figure 15:
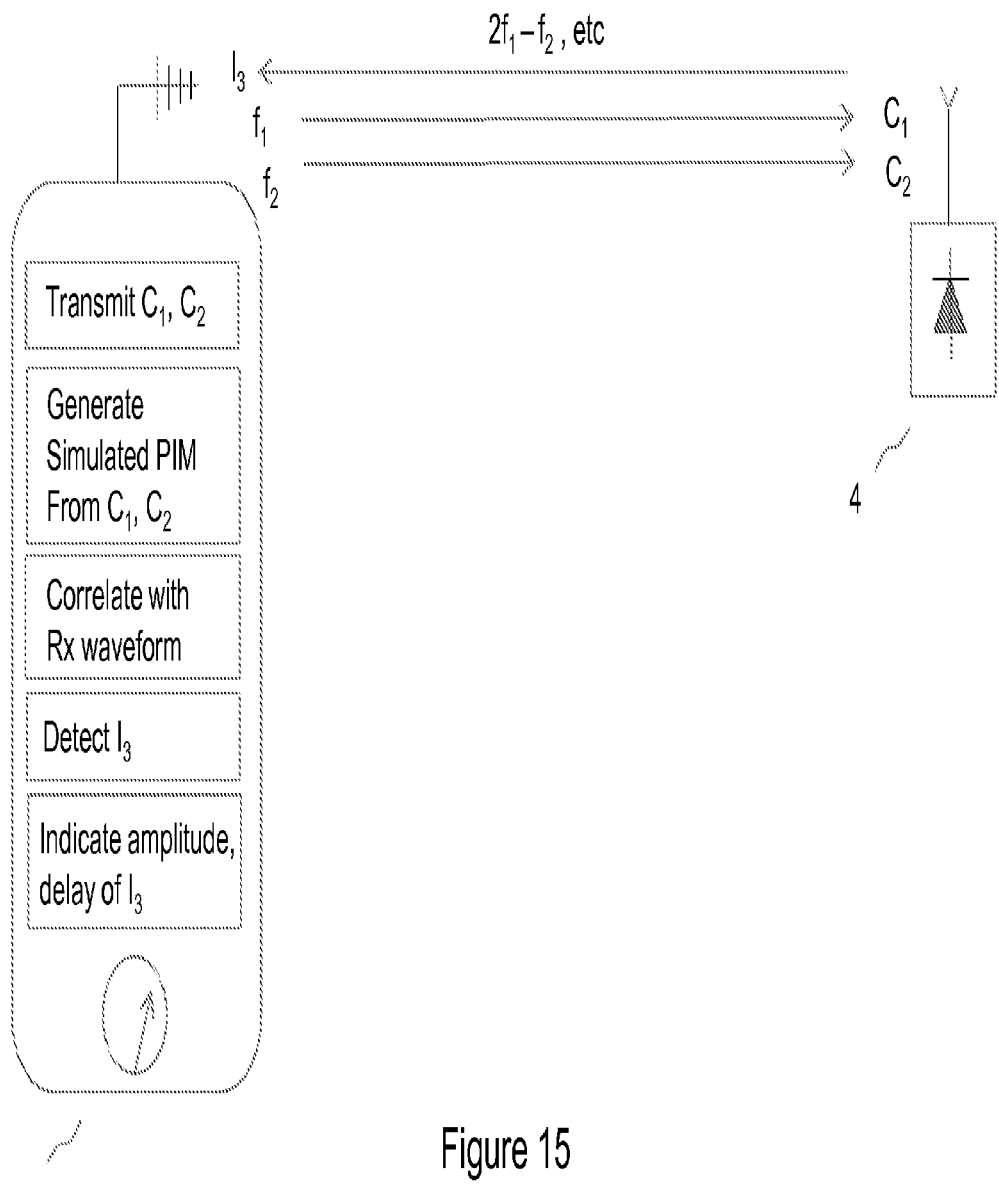
FIG. 15 is a schematic diagram illustrating detection of interference caused by passive intermodulation in an embodiment of the invention in which the detector is arranged to transmit test signals.

FIG. 15 shows an alternative embodiment of the invention, in which the apparatus, such as the PIM detector 34 is arranged to transmit at least the first signal and second signals as test signals. The first and second signals may be chosen as signals that would be expected to produce intermodulation products within a channel of interest in which a received waveform is to be received. At least the first signal may be transmitted within a band used for the transmission of payload signals, such as for example a band that may be used for transmission of LTE (Long Term Evolution) signals in an E-UTRAN radio access network. The first signal may be transmitted outside part of the band used for transmission of payload signals. So, for example, not all of the potential LTE band may be occupied by the payload signals. It may be arranged, for example, for the payload signals to occupy a reduced range of frequencies within the band in dependence on a determination of a traffic load level of payload signals, so that the test signals may be transmitted, say, at periods when the band is lightly used, so that less bandwidth is required for the band, which may be occupied by a reduced bandwidth LTE carrier. The first and second signals may be transmitted in dependence on the determination of a traffic load level of payload signals, so for example, the first and second signals may only be transmitted when there is a low traffic load level. The first and second signals, as shown in FIG. 14, may be modulated with a code, so that the PIM generated may be recognised as being generated from the first and second signals.

The generation of test signals may be available as an option for a PIM detector, which would be useful in tracking down PIM since PIM could be excited in a particular target device.

As an alternative to the embodiment of FIG. 15, the test signals $C_1$ and $C_2$ may be generated in the PIM detector and connected to a transmission tower using coaxial cables, so that the test signals may be transmitted from the base station antenna or antennas. Also, the received waveform may be received from base station antennas via coaxial cable. As a further variation, the test signals may be generated in the PIM detector 34 in an arrangement as shown in FIG. 4, where the PIM detector is installed in a data link between a baseband unit and a radio head unit having an upconverter and down-converter. In this case, the test signals $C_1$ and $C_2$ would be generated in the PIM detector instead of being received from the baseband unit 16, and the generated test signals would be transmitted on the data link to the radio head unit 18 for transmission.

Figure 16:
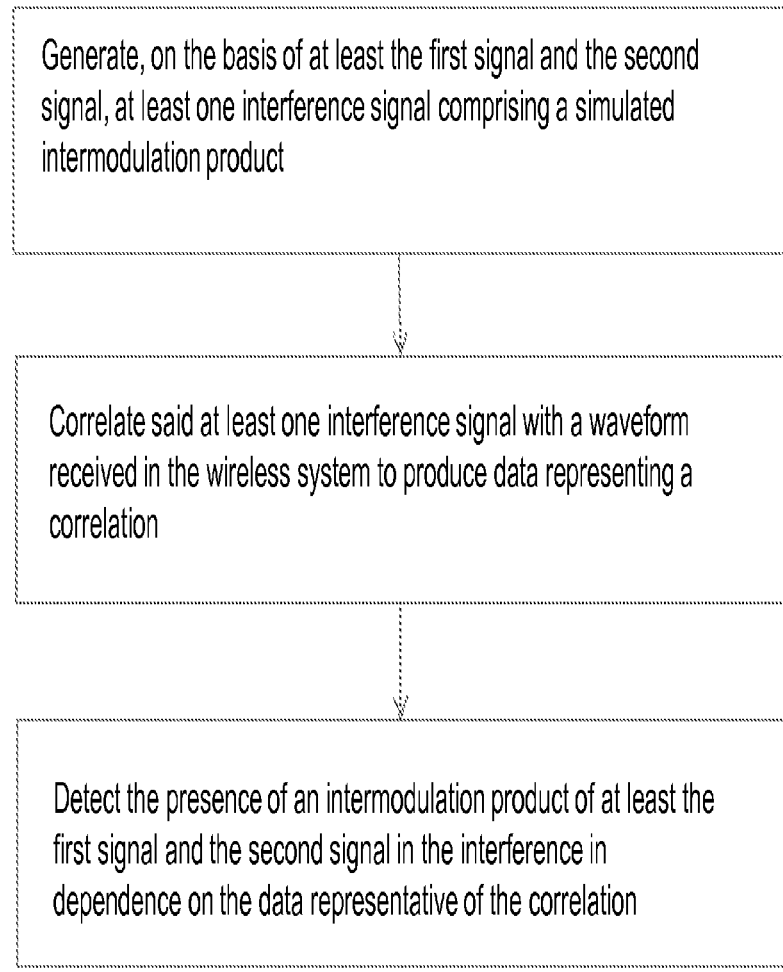
FIG. 16 is a flow diagram of a method according to an embodiment of the invention.

FIG. 16 shows a flow diagram of a method according to an embodiment of the invention.

In various embodiments of the invention, the delay value that is selected in dependence on data representative of the correlation may be a delay value that is applied to simulated intermodulation products generated from the first and second signal to form the delayed interference signals, that is to say the delay is applied after the simulated intermodulation products are generated. Alternatively, the delay value that is selected in dependence on data representative of the correlation may be a delay value that is a value of a delay applied to the first signal to form the delayed interference signals, and/or the delay value may be a value of a delay applied to the second signal to form the delayed interference signals. The delay value applied to the first signal may be different from the delay value applied to the second signal, for example where the delay from the first and second signals to the source of intermodulation products is different, for example where the first and second signals are transmitted from different antennas and the delay of each to an external PIM source is different.

In embodiments of the invention, an equaliser may be substituted for some or all of the variable delay blocks, and the settings of the equaliser may be selected on the basis of the data representative of the correlations for trial values of the equaliser settings, in a similar manner to the selection of the at least one delay value. An equaliser may have a variation of amplitude, phase and group delay across its pass band in a controllable fashion, and may be used to correct for a distortion to the first or second signal in the transmission path to the source of intermodulation products, or for distortion to the interference signal.

So, embodiments of the invention have been described in which a search is carried out for delay, frequency and/or amplitude values, for example by varying the values applied by blocks 64, 66, 68, 70, 72, 74, 76, 78, 83, 84 shown in FIG. 12, and choosing the combination of values of the various parameters in dependence on data representing the correlation value, typically the combination that produces the greatest magnitude. Similarly, referring to FIG. 5, a search is carried out for the values of delay in functional block 52, and/or frequency offset in block 50 in dependence on data representing the correlation, typically selecting the combination of values that maximises the correlation. The presence of a correlation peak indicates that intermodulation products have been detected, and detection of intermodulation products may be may be indicated if the data representing the correlation exceeds a predetermined threshold. The selected combination of simulated intermodulation products with the received signal in order to cancel intermodulation products may be dependent on the detection of intermodulation products.

The process of searching over multiple hypotheses about signal delays, amplitudes and phases may be arranged as a series of successive stages. For example, the search process may be split into the following sub-processes. Initially, a coarse acquisition process may be employed, whereby approximate phases, amplitudes, delays and/or frequencies are found by searching over many possibilities with relatively large steps and a relatively large search range. Following this, a finer acquisition process may be employed, using finer steps, focussed more tightly around the values found by the coarse acquisition process. Then, a tracking mode may be employed, whereby the best solution is updated slowly in time, using an 'early-late-gate' approach, that is to say testing alternative hypothesis either side of the current best hypothesis, to track changes in parameters. This may reduce processor loading in comparison with the coarse and fine acquisition phases.

As has been described, for example in connection with FIGS. 7 and 8, in embodiments of the invention, knowledge of the mathematics describing how the PIM is originally generated in the PIM source nonlinearity may be used to generate a local replica of the PIM, that is to say simulated intermodulation products, which is used to correlate with the actual PIM in the received waveform and to detect the PIM on the basis of, for example, the magnitude of the correlation. The mathematics shows that the PIM signal is a deterministic function of the input signals, i.e. downlink transmitted signals, and is independent (apart from a frequency shift) of the frequency separation between those input signals. For different PIM-generating sources, the form of signal from each exponent of nonlinearity is the same, apart from some arbitrary amplitude/phase scaling, if the relative delays between different PIM sources are small compared to the correlation time of the signal. However, the relative powers of the different exponent contributions might be different. A search may be carried out over different relative powers, and a combination of values may be selected that produces the greatest magnitude of correlation between the simulated intermodulation products and the intermodulation products in interference to the received waveform. In an embodiment of the invention, the method of PIM detection consists of the following steps. Firstly, generating a local replica of the PIM based on knowledge of the transmitted signal. Secondly, determining the exact phase, amplitude, delay and/or frequency offset of the PIM as it appears in the receive path by cross-correlating the aggregate uplink signal with the local replica. Thirdly, comparing data representative of the cross-correlation with a predetermined threshold to detect the presence of PIM.

In the case of MIMO transmissions, the processing is somewhat more complex, as described earlier. In the MIMO case, it may not be possible to determine the local replica of the PIM signal independently of the cross-correlation process. In the MIMO case both of these steps may be embedded within a loop which tests many different candidate local replicas, one for each hypothesis of the relative amplitude, phase and delay of the multiple MIMO transmissions as they arrive at the PIM source. The winning hypothesis is the one, for example, giving the highest-energy cross-correlation, that is to say the data representing the correlation indicates the highest magnitude, in the second step. This represents the hypothesis which generates a local replica which is most like the actual received PIM. Once this best local replica has been determined, and its phase, amplitude, delay and frequency offset have also been found, the third step may be performed, and the PIM may be detected on the basis of the magnitude of the greatest correlation.

FIG. 12 illustrates only a single-branch uplink receiver, operating on a single MIMO uplink data stream. However, a cellular base station typically has multiple uplink receive branches, typically having at least a main and a diversity receiver branch in each sector. A multiple branch receiver may be implemented by duplicating the functional blocks shown in FIG. 12. However, some of the processing for one branch may be common to the other, and a more efficient implementation may be achieved by sharing some functional blocks between MIMO data streams, that is to say receive channels, or branches, from respective MIMO antennas. For example, the determination of the relative amplitudes and phases of the MIMO transmit branches, as they impinge on the PIM source may be shared between MIMO receive branches, so that the winning hypothesis on one receive branch may be applied to another branch. Alternatively, each hypothesis, that is to say combination of trial phase and amplitude, may be tested in parallel on both receive branches, and metrics for each receive branch may be combined for each hypothesis. The different hypotheses may then be ranked, for example on the basis of correlation magnitude between the simulated intermodulation products and the intermodulation products in the received waveform. This may make the best use of the available information. Other receive parameters which may be estimated in this combined fashion include delay and frequency offset, which might be common across the multiple receive branches, particularly if the receiver filters are well matched, or calibrated, for delay and if local oscillators are shared between branches, so that frequency offset would be expected to be the same between branches.

The above processing over multiple receive branches may yield information as to whether any PIM interference is generated internally to the RF subsystem or externally in the environment. For example, if the winning hypothesis about the relative amplitude and phases of two MIMO transmissions is the same on both receive branches, and each transmit branch makes a significant contribution to the overall PIM signal, then this may indicate that the PIM source is located in the external environment, since there are significant contributions from both transmit branches.

Embodiments of the invention and advantages are described as follows.

In an embodiment of the invention, the method comprises providing an indication, on the basis of the detecting of the presence of the intermodulation product of at least the first signal and the second signal, that interference has been detected.

This has an advantage that an operator may be alerted to the presence of intermodulation products, so that remedial action may be taken. The indication may be automatically logged, or used to activate another apparatus such as an interference canceller that may be arranged to combine the at least one interference signal comprising a simulated intermodulation product with the received waveform in antiphase to the intermodulation product in the interference in order to reduce or cancel the interference.

In an embodiment of the invention, detecting the presence of the intermodulation product comprises comparing the data representative of the correlation with a predetermined threshold. This has the advantage that an appropriate probability of detection and false alarm rate may be selected by selection of the predetermined threshold.

In an embodiment of the invention, the method comprises providing an indication, on the basis of the detecting of the presence of the intermodulation product of at least the first signal and the second signal, that an intermodulation product has been detected. This has the advantage that a specific intermodulation product may be detected.

In an embodiment of the invention, the method comprises providing an indication, on the basis of the data representing a correlation, of an amplitude of the intermodulation product of at least the first signal and the second signal.

This has an advantage that an operator may be provided with the indication of the amplitude of the intermodulation product, which may be advantageous in locating a source of the intermodulation product.

In an embodiment of the invention, the method comprises synchronising said at least one interference signal comprising the simulated intermodulation product with the received waveform.

In an embodiment of the invention, the method comprises generating, on the basis of at least the first signal and the second signal, a plurality of delayed interference signals comprising simulated intermodulation products generated using a plurality of delay values, wherein said at least one interference signal is one of the plurality of delayed interference signals;
  correlating each of the delayed interference signals with the received waveform to produce data representing a correlation for each delayed interference signal;
  selecting a delay value in dependence on a comparison of the data representative of the correlations; and
  detecting the presence of an intermodulation product of at least the first signal and the second signal in the interference in dependence on the data representative of the correlation for the selected delay value.

In an embodiment of the invention, the method comprises providing an indication, on the basis of the selected delay value, of a delay of the detected intermodulation product.

In an embodiment of the invention the method comprises processing at least the first signal and the second signal at baseband to produce baseband intermodulation products.

In an embodiment of the invention the method comprises frequency shifting the baseband intermodulation products to produce the simulated intermodulation products.

In an embodiment of the invention, the frequency shifting aligns the simulated intermodulation products in frequency with the intermodulation products in the interference in the received waveform.

In an embodiment of the invention the frequency shifting comprises shifting by a frequency determined by at least a frequency of a channel in which the received waveform is received, a frequency of the first radio frequency signal, and a frequency of the second radio frequency signal.

In an embodiment of the invention the frequency shifting comprises shifting by a frequency determined by at least an order of an intermodulation product in the interference to the received waveform.

In an embodiment of the invention, the frequency shifting comprises shifting by a frequency determined by:
  adjusting the frequency shift to a plurality of frequency shift values; and
  selecting a frequency for said frequency shifting on the basis of data representing a correlation of a delayed interference signal with the received waveform for each of the plurality of frequency shift values.

In an embodiment of the invention, the method comprises providing an indication, on the basis of the frequency for said frequency shifting, of a frequency of the detected intermodulation product.

In an embodiment of the invention, the method comprises deriving at least the first and second signals at baseband from a downlink sample stream from a base station baseband unit to a digital up-converter unit and deriving the received waveform at baseband from an uplink sample stream from a digital down-converter unit to a base station baseband unit.

In an embodiment of the invention, the uplink and downlink sample streams are Common Public Radio Interface (CPRI) data streams.

In an embodiment of the invention, the method comprises receiving at least the first signal from an antenna.

In an embodiment of the invention, the method comprises receiving the second signal from an antenna.

In an embodiment of the invention, the method comprises receiving the received waveform from an antenna.

In an embodiment of the invention, the first signal comprises at least a first component and a second component, each component having been transmitted from a different antenna, and the plurality of delay values comprises a plurality of delay values for the first component and a plurality of delay values for the second component, the method comprising:
  for each of the plurality of delay values of the first component and for each of the plurality of delay values for the second component,
  correlating the respective delayed interference signal with the received waveform to produce data representative of a correlation for each of a plurality of amplitude values and for each of a plurality of phase values for the second component; and
  selecting an amplitude value and a phase value of the second component, a delay value of the first component, and a delay value of the second component in dependence on a comparison of the data representative of the correlations.

In an embodiment of the invention, the plurality of amplitude values and the plurality of phase values of the second component are relative values, being relative to the amplitude and phase of the first component.

In an embodiment of the invention, the first signal comprises a further component of the first signal having been transmitted from an antenna not used to transmit the first component of the first signal or the second component of the first signal, and the plurality of delay values comprises a plurality of delay values for the further component, the method comprising:
  for each of the plurality of delay values of the first component, for each of the plurality of delay values for the second component, and for each of the plurality of delay values of the further component,
  correlating the respective delayed interference signal with the received signal to produce data representative of a correlation for each of a plurality of amplitude values and for each of a plurality of phase values for each of the second and further components; and
  selecting an amplitude value and a phase value of each of the second component and the further component and a delay value of the first component, a delay value of the second component and a delay value of the further component in dependence on a comparison of the data representative of the correlations.

In an embodiment of the invention, the second signal comprises at least a first component of the second signal and a second component of the second signal, each of the first and second components of the second signal having been transmitted from a different antenna from the antenna used to transmit the other, the method comprising:
  for each of the plurality of delay values of the first component of the first signal, for each of the plurality of delay values for the second component of the first signal, for each of the plurality of delay values of the first component of the second signal, and for each of the plurality of delay values for the second component of the second signal,
  correlating the respective delayed interference signal with the received signal to produce data representative of a correlation for each of a plurality of amplitude values and for each of a plurality of phase values for each of the second component of the first signal and the second component of the second signal; and selecting an amplitude value and a phase value of the second component of the first signal and the second component of the second signal and a delay value of the first component of the first signal, a delay value of the second component of the first signal, a delay value of the first component of the second signal, and a delay value of the second component of the second signal in dependence on a comparison of the data representing the correlations.

In an embodiment of the invention, each signal component is a Multiple Input Multiple Output (MIMO) stream.

In an embodiment of the invention generating at least one interference signal comprising a simulated intermodulation product is on the basis of the first signal, the second signal and a third signal.

In an embodiment of the invention, at least the first and second signals are arranged to carry payload data.

In an embodiment of the invention, at least the first and second signals are carriers of a cellular wireless network.

In an embodiment of the invention, the method comprises transmitting at least the first signal and second signals as test signals.

In an embodiment of the invention, the method comprises transmitting the first signal within a band used for the transmission of payload signals.

In an embodiment of the invention, the method comprises transmitting the first signal outside part of the band used for transmission of payload signals.

In an embodiment of the invention, the method comprises arranging for the payload signals to occupy a reduced range of frequencies within the band in dependence on a determination of a traffic load level of payload signals.

In an embodiment of the invention, the method comprises transmitting the first and second signals in dependence on the determination of a traffic load level of payload signals.

In an embodiment of the invention, the first and second signals are modulated with a code.

In an embodiment of the invention, the apparatus comprises an interface to a downlink sample stream from a base station baseband unit, the interface being arranged to provide at least the first signal.

In an embodiment of the invention, the apparatus comprises an interface to an uplink sample stream from a radio frequency unit, the interface being arranged to provide the received waveform.

In an embodiment of the invention, the apparatus is arranged to be connected in series with a data link between a base station baseband unit and a radio frequency unit.

In an embodiment of the invention, the apparatus comprises a first antenna for receiving at least the first signal.

In an embodiment of the invention, the apparatus further comprises a second antenna for receiving at least the first signal.

In an embodiment of the invention, the apparatus is arranged to receive first and second MIMO components of the first signal in a first vectorial relationship at the first antenna and in a second vectorial relationship at the second antenna, the apparatus being arranged to combine components of the first signal received from the second antenna with components of the first signal received from the first antenna using a weight value, to provide the first signal to be used as basis for the generation of the least one interference signal comprising a simulated intermodulation product.

In an embodiment of the invention, the apparatus is arranged to determine the weight value by a search of weight values, on the basis of the data representing the correlation.

In an embodiment of the invention, the apparatus comprises a directional antenna for receiving the received waveform arranged to have a gain that is higher than a gain of the first antenna.

In an embodiment of the invention, the apparatus is a hand held device.

In an embodiment of the invention, a non-transitory computer-readable storage medium comprises a set of computer-readable instructions stored thereon, which, when executed by a processing system, cause the processing system to control apparatus to carry out a method of detecting interference in a wireless network, the interference comprising an intermodulation product of at least a first signal and a second signal, the method comprising:
generating, on the basis of at least the first signal and the second signal, at least one interference signal comprising a simulated intermodulation product;
correlating said at least one interference signal with a waveform received in the wireless system to produce data representing a correlation; and
detecting the presence of an intermodulation product of at least the first signal and the second signal in the interference in dependence on the data representative of the correlation.

The above embodiments are to be understood as illustrative examples of the invention. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method of testing for generation of passive intermodulation (PIM) in a wireless network, the method comprising:
connecting a PIM test apparatus to a radio head of a base station of the wireless network using a baseband data link;
generating a first test signal and a second test signal at the PIM test apparatus;
sending the first test signal and the second test signal via the baseband data link to the radio head for transmission by the radio head, the first test signal being for transmission at a first radio frequency and the second test signal being for transmission at a second radio frequency;
receiving at baseband at the PIM test apparatus, via the baseband data link, a waveform received at the radio head at a third radio frequency;
generating, at the PIM test apparatus at baseband, on the basis of at least the first signal and the second signal, at least one interference signal comprising a simulated intermodulation product;
correlating, at the PIM test apparatus said at least one interference signal with the waveform received at the radio head to produce data representing a correlation; and
detecting the generation of PIM in the wireless network in dependence on the data representing the correlation.

2. The method of claim 1, wherein the baseband data link is a Common Public Radio Interface (CPRI) link.

3. The method of claim 1, further comprising providing an indication, on the basis of the data representing the correlation, of an amplitude of the PIM generated by at least the first test signal and the second test signal.

4. The method of claim 1, further comprising:
generating, on the basis of at least the first signal and the second signal at baseband, a plurality of delayed interference signals comprising simulated intermodulation products generated using a plurality of delay values, wherein said at least one interference signal is one of the plurality of delayed interference signals;
correlating each of the delayed interference signals with the received waveform to produce data representing a correlation for each delayed interference signal; and
detecting the generation of PIM in the wireless network in dependence on the data representing the correlations.

5. The method of claim 4, further comprising providing an indication, on the basis of the data representing the correlations, of a delay of the generated PIM in the wireless network.

6. The method of claim 1, further comprising frequency shifting baseband intermodulation products of the first and second test signals to produce the simulated intermodulation product, whereby to align the simulated intermodulation product in frequency with an intermodulation product in the received waveform.

7. The method of claim 6, wherein said frequency shifting comprises shifting by a frequency determined by:
adjusting the frequency shift to a plurality of frequency shift values; and
selecting a frequency for said frequency shifting on the basis of data representing a correlation of an interference signal comprising a simulated intermodulation product with the received waveform for each of the plurality of frequency shift values.

8. The method of claim 1, further comprising modulating the first and second test signals with a code.

9. A test apparatus for testing for generation of passive intermodulation (PIM) in a wireless network, the apparatus comprising:
an interface configured to connect to a baseband data link, the baseband data link being configured to connect the test apparatus to a radio head of a base station of the wireless network; and
one or more processors configured to cause the test apparatus to:
generate a first test signal and a second test signal;
send the first test signal and the second test signal via the baseband data link to the radio head for transmission by the radio head, the first test signal being configured for transmission at a first radio frequency and the second test signal being configured for transmission at a second radio frequency;
receive at baseband, via the baseband data link, a waveform received at the radio head at a third radio frequency;
generate, on the basis of at least the first signal and the second signal at baseband, at least one interference signal comprising a simulated intermodulation product;
correlate said at least one interference signal with the waveform received at the radio head to produce data representing a correlation; and
detect the generation of PIM in the wireless network in dependence on the data representing the correlation.

10. The test apparatus of claim 9, wherein the baseband data link is a Common Public Radio Interface (CPRI) link.

11. The test apparatus of claim 9, wherein the test apparatus is configured to provide an indication, on the basis of the data representing the correlation, of an amplitude of the PIM generated by at least the first test signal and the second test signal.

12. The test apparatus of claim 9, wherein the test apparatus is configured to generate, on the basis of at least the first signal and the second signal at baseband, a plurality of delayed interference signals comprising simulated intermodulation products generated using a plurality of delay values, wherein said at least one interference signal is one of the plurality of delayed interference signals;
correlate each of the delayed interference signals with the received waveform to produce data representing a correlation for each delayed interference signal; and
detect the generation of PIM in the wireless network in dependence on the data representing the correlations.

13. The test apparatus of claim 12, wherein the test apparatus is configured to provide an indication, on the basis of the data representing the correlations, of a delay of the generated PIM in the wireless network.

14. The test apparatus of claim 9, wherein the test apparatus is configured to frequency shift baseband intermodulation products of the first and second test signals to produce the simulated intermodulation product, whereby to align the simulated intermodulation product in frequency with an intermodulation product in the received waveform.

15. The test apparatus of claim 14, wherein the test apparatus is configured to frequency shift the baseband intermodulation products of the first and second test signals by a frequency determined by:
adjusting the frequency shift to a plurality of frequency shift values; and
selecting a frequency for said frequency shifting on the basis of data representing a correlation of an interference signal comprising a simulated intermodulation product with the received waveform for each of the plurality of frequency shift values.

16. The test apparatus of claim 9, wherein the test apparatus is configured to modulate the first and second test signals with a code.

* * * * *